(12) United States Patent
Gemin et al.

(10) Patent No.: US 11,539,316 B2
(45) Date of Patent: Dec. 27, 2022

(54) ACTIVE STABILITY CONTROL OF COMPRESSION SYSTEMS UTILIZING ELECTRIC MACHINES

(71) Applicant: General Electric Company, Schenectady, NY (US)

(72) Inventors: Paul Robert Gemin, Cincinnati, OH (US); Arthur Vorwerk Radun, Galway, NY (US); Dominic Barone, Centerville, OH (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 16/526,184

(22) Filed: Jul. 30, 2019

(65) Prior Publication Data
US 2021/0033101 A1    Feb. 4, 2021

(51) Int. Cl.
*H02P 9/00*    (2006.01)
*F04D 27/02*    (2006.01)
(Continued)

(52) U.S. Cl.
CPC ............. *H02P 9/006* (2013.01); *F01D 3/00* (2013.01); *F01D 15/10* (2013.01); *F02C 7/00* (2013.01);
(Continued)

(58) Field of Classification Search
CPC ... H02P 9/006; H02P 9/02; F01D 3/00; F01D 15/10; F01D 5/22; F02C 7/00; F04D 27/001; F04D 27/0223; H02K 7/1823
See application file for complete search history.

(56) References Cited

U.S. PATENT DOCUMENTS

| 654,373 A | 7/1900 | Wikstrom |
| 3,598,211 A | 8/1971 | Fergle |
| (Continued) | | |

FOREIGN PATENT DOCUMENTS

| JP | 2010283904 A | 12/2010 |
| WO | WO0238963 A1 | 5/2002 |

OTHER PUBLICATIONS

Gravdahl et al., Active surge control of centrifugal compressors using drive torque, IEEE Explore, Decision and Control, 2001, Proceedings of the 40th IEEE Conference on Dec. 4-7, 2001, pp. 6. http://ieeexplore.ieee.org/document/981067/.
(Continued)

*Primary Examiner* — Viet P Nguyen
(74) *Attorney, Agent, or Firm* — Dority & Manning, P.A.

(57) ABSTRACT

The present disclosure is directed to turbine engines and systems for active stability control of rotating compression systems utilizing an electric machine operatively coupled thereto. In one exemplary aspect, an electric machine operatively coupled with a compression system, e.g., via a shaft system, is controlled to provide shaft damping for instability fluctuations of the pressurized fluid stream within the compression system. Based on control data indicative of a system state of the compression system, a control parameter of the electric machine is adjusted to control or change an output of the shaft system. Adjusting the shaft system output by adjusting one or more control parameters of the electric machine allows the compression system to dampen instability fluctuations of the fluid stream within the compression system. A method for active stability control of a compression system operatively coupled with an electric machine via a shaft system is also provided.

20 Claims, 12 Drawing Sheets

(51) Int. Cl.
*F04D 27/00* (2006.01)
*F01D 15/10* (2006.01)
*F01D 3/00* (2006.01)
*H02P 9/02* (2006.01)
*F02C 7/00* (2006.01)
*H02K 7/18* (2006.01)
*F01D 5/22* (2006.01)

(52) U.S. Cl.
CPC ....... *F04D 27/001* (2013.01); *F04D 27/0223* (2013.01); *H02K 7/1823* (2013.01); *H02P 9/02* (2013.01); *F01D 5/22* (2013.01)

(56) References Cited

U.S. PATENT DOCUMENTS

| | | |
|---|---|---|
| 3,872,292 A | 3/1975 | Dawson, Jr. |
| 3,999,115 A | 12/1976 | South et al. |
| 4,114,246 A | 9/1978 | Kamman |
| 4,311,253 A | 1/1982 | Putman et al. |
| 4,370,560 A | 1/1983 | Faulkner et al. |
| 4,448,021 A | 5/1984 | Hawkins |
| 4,531,361 A | 7/1985 | Zagranski et al. |
| 5,050,446 A | 9/1991 | Takashima et al. |
| 5,174,109 A | 12/1992 | Lampe |
| 5,259,188 A | 11/1993 | Baxter et al. |
| 5,799,484 A | 9/1998 | Nims |
| 5,803,408 A | 9/1998 | Gast |
| 6,105,697 A | 8/2000 | Weaver |
| 6,169,332 B1 | 1/2001 | Taylor et al. |
| 6,320,511 B1 | 11/2001 | Cronin et al. |
| 6,545,373 B1 | 4/2003 | Andres et al. |
| 6,834,831 B2 | 12/2004 | Daggett |
| 6,992,403 B1 | 1/2006 | Raad |
| 7,175,136 B2 | 2/2007 | Shah et al. |
| 7,230,205 B2 | 6/2007 | Twerdochlib |
| 7,251,942 B2 | 8/2007 | Dittmar et al. |
| 7,285,871 B2 | 10/2007 | Derouineau |
| 7,380,749 B2 | 6/2008 | Fucke et al. |
| 7,423,411 B2 | 6/2008 | Sihler |
| 7,417,337 B1 | 8/2008 | Suttie |
| 7,495,354 B2 | 2/2009 | Herrmann |
| 7,518,344 B2 | 4/2009 | Sihler |
| 7,528,499 B2 | 5/2009 | Suttie |
| 7,628,359 B2 | 12/2009 | Shah et al. |
| 7,677,502 B2 | 3/2010 | Lawson et al. |
| 7,818,969 B1 | 10/2010 | Hotto |
| 7,936,086 B2 | 5/2011 | Yue et al. |
| 7,958,727 B2 | 6/2011 | Arnold |
| 7,965,201 B2 | 6/2011 | Shah et al. |
| 7,970,497 B2 | 6/2011 | Derouineau et al. |
| 8,016,228 B2 | 9/2011 | Fucke et al. |
| 8,039,983 B2 | 10/2011 | Cote et al. |
| 8,141,360 B1 | 3/2012 | Huber |
| 8,193,761 B1 | 6/2012 | Singh |
| 8,217,630 B2 | 7/2012 | Markunas et al. |
| 8,432,048 B1 | 4/2013 | Paulino |
| 8,489,246 B2 | 7/2013 | Dooley |
| 8,522,522 B2 | 9/2013 | Poisson |
| 8,568,938 B2 | 10/2013 | Gao et al. |
| 8,602,359 B2 | 12/2013 | Stothers |
| 8,631,657 B2 | 1/2014 | Hagen et al. |
| 8,657,227 B1 | 2/2014 | Bayliss et al. |
| 8,692,489 B2 | 4/2014 | Maalioune |
| 8,742,605 B1 | 6/2014 | Wilhide et al. |
| 8,766,479 B2 | 7/2014 | Dorn et al. |
| 8,836,160 B1 | 9/2014 | Paterson et al. |
| 8,925,660 B2 | 1/2015 | Bowdich et al. |
| 8,928,166 B2 | 1/2015 | Seger et al. |
| 8,950,703 B2 | 2/2015 | Bayliss et al. |
| 8,957,539 B1 | 2/2015 | Ralston |
| 8,997,493 B2 | 4/2015 | Brust et al. |
| 9,045,996 B2 | 6/2015 | Anghel et al. |
| 9,059,440 B2 | 6/2015 | Hotto |
| 9,068,562 B1 | 6/2015 | Budica et al. |
| 9,154,067 B2 | 10/2015 | Frampton et al. |
| 9,201,031 B2 | 12/2015 | Lilie et al. |
| 9,218,002 B2 | 12/2015 | Schulte et al. |
| 9,257,838 B2 | 2/2016 | Gataric et al. |
| 9,303,716 B2 | 4/2016 | Maranville et al. |
| 9,637,217 B2 | 5/2017 | Marrinan et al. |
| 9,759,134 B2 | 9/2017 | Balcer |
| 9,821,917 B2 | 11/2017 | Becker et al. |
| 9,932,985 B2 | 4/2018 | Reynolds et al. |
| 9,938,853 B2 | 4/2018 | Gemin et al. |
| 2003/0127930 A1 | 7/2003 | Mackulin et al. |
| 2005/0084565 A1 | 4/2005 | Gutknecht et al. |
| 2006/0232250 A1 | 10/2006 | Sihler et al. |
| 2007/0108771 A1 | 5/2007 | Jones et al. |
| 2007/0279012 A1 | 12/2007 | Sihler |
| 2009/0000912 A1 | 1/2009 | Battles et al. |
| 2009/0001940 A1 | 1/2009 | Sihler et al. |
| 2009/0179424 A1 | 7/2009 | Yaron |
| 2010/0038473 A1 | 2/2010 | Schneider et al. |
| 2010/0141193 A1 | 6/2010 | Rotondo et al. |
| 2011/0115444 A1 | 5/2011 | Markunas et al. |
| 2011/0169443 A1 | 7/2011 | Baker et al. |
| 2012/0214605 A1 | 8/2012 | Snook et al. |
| 2013/0098060 A1 | 4/2013 | Suciu et al. |
| 2013/0099608 A1 | 4/2013 | Bradley et al. |
| 2013/0106330 A1 | 5/2013 | Schramm et al. |
| 2013/0139515 A1 | 6/2013 | Schlak |
| 2014/0007584 A1 | 1/2014 | Hong et al. |
| 2014/0084677 A1 | 3/2014 | Haillot |
| 2014/0245748 A1 | 9/2014 | Anghel et al. |
| 2014/0271114 A1 | 9/2014 | Phillips et al. |
| 2014/0338352 A1 | 11/2014 | Edwards et al. |
| 2015/0005990 A1 | 1/2015 | Burns et al. |
| 2015/0014479 A1 | 1/2015 | Bayliss et al. |
| 2015/0035501 A1 | 2/2015 | Rozman et al. |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0091375 A1 | 4/2015 | Mackin |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151847 A1 | 6/2015 | Krug et al. |
| 2015/0159552 A1 | 6/2015 | Rodriguez et al. |
| 2015/0180393 A1 | 6/2015 | Tesch |
| 2015/0183522 A1 | 7/2015 | Ouellette |
| 2016/0214727 A1 | 7/2016 | Hamel et al. |
| 2016/0218650 A1 | 7/2016 | Gajanayake et al. |
| 2017/0044989 A1 | 2/2017 | Gemin et al. |
| 2017/0081034 A1 | 3/2017 | Marrinan et al. |
| 2017/0114664 A1 | 4/2017 | Gemin et al. |
| 2017/0222518 A1 | 8/2017 | Gemin et al. |
| 2017/0226934 A1* | 8/2017 | Robie ................. F02C 7/36 |
| 2017/0346427 A1* | 11/2017 | Thet ................... F02C 3/10 |
| 2018/0058330 A1 | 3/2018 | Munevar |
| 2018/0065755 A1 | 3/2018 | Teicholz et al. |
| 2019/0368500 A1 | 12/2019 | Epstein |

OTHER PUBLICATIONS

Torrisi et al., Active Surge control of electrically driven centrifugal compressors, IEEE Explore, Control Conference (ECC), 2015 European Conference—Linz Austria, Jul. 15-17, 2015. http://ieeexplore.ieee.org/document/7330768/ (Abstract Only).

Bohagen, Active surge control of centrifugal compression systems, Norwegian University of Science and Technology, Trondheim, Jun. 2007, pp. 215. http://folk.ntnu.no/tomgra/PhDThesisBohagen.pdf.

Wang et al., Nonlinear control design for rotating stall with magnetic bearing actuators, IEEE Explore, Control Applications, 1999, Proceedings of the 1999 IEEE International Conference on Aug. 22-27, 1999. http://ieeexplore.ieee.org/document/807752 (Abstract Only).

Wang et al., Nonlinear analysis and control of rotating stall in axial flow compressors, IEEE Explore, American Conference, 1994, Jun. 29-Jul. 1, 1994. http://ieeexplore.ieee.org/document/752493 (Abstract Only).

(56) References Cited

OTHER PUBLICATIONS

U.S. Appl. No. 15/685,072, filed Aug. 24, 2017.
U.S. Appl. No. 15/467,471, filed Mar. 23, 2017.
Schramm, Damping of Torsional Interaction Effects in Power Systems, 2010.
Hasse & Wrede, Torsional Visco-Dampers, 2018 Knorr-Bremse AG www.hassewrede.com, http://www.hassewrede.com/en/produkte/yiscodmpfer/viscodmpfer_1.jsp.
Geng et al., Stability Analysis and Improvements for Variable-Speed Multipole Permanent Magnet Synchronous Generator-Based Wind Energy Conversion System, IEEE Transactions on Sustainable Energy, vol. 2, No. 4, Oct. 2011, pp. 459 to 467.
Oxford Dictionary of Mechanical Engineering, Oxford University Press, published 2013, pp. 40 and 154.

\* cited by examiner

ACTIVE STABILITY CONTROL OF COMPRESSION SYSTEMS UTILIZING ELECTRIC MACHINES

FIELD

The present disclosure relates generally to active stability control of rotating compression systems utilizing an electric machine operatively coupled thereto.

BACKGROUND

Compression systems may be subject to certain flow instabilities during operation, including rotating stall and surge. Example compression systems include rotating compressors and pumps. Generally, surge is caused by oscillations of mass flow and pressure through the compression system and rotating stall is caused by locally reduced or blocked flow within the compression system. Both surge and rotating stall are undesirable. Particularly, surge oscillations or rapid pulsations in the flow may damage components of the compression system as well as other components positioned upstream and/or downstream of the compression system. Rotating stall results in inefficient operation of the compression system. Rotating stall and surge have other drawbacks as well.

Many compression systems, such as axial and centrifugal compressors for turbine engines, have an associated compressor map that describes the compressor's characteristics. For instance, compressor maps typically include a surge line that demarcates a stable operating region from an unstable operating region for various characteristic curves, e.g., speed settings of the turbine engine. If the mass flow through the compressor falls above the surge line, or more particularly to the left of the surge line, a flow instability results. On the other hand, if the mass flow through the compressor is below the surge line, or more particularly to the right of the surge line, the compression system is operating at a stable operating point or range.

Conventionally, to prevent surge, a surge margin or surge control line is drawn at a distance from the surge line and surge avoidance controls of the compression system ensure that the operating point of the compression system does not cross the surge control line. That is, the surge avoidance controls ensure that the operating point is at or right of the surge control line. However, such surge avoidance schemes restrict the operating range of the compression system and thus limit efficiency.

Other techniques for accounting for surge and rotating stall in addition or alternatively to surge avoidance controls include active surge control schemes that seek to stabilize surge and rotating stall rather than avoiding them. For instance, compressors may include various variable geometry components that may be actuated to control surge and rotating stall. For example, recycle, bleed, and throttle valves, variable guide vanes, etc. have been utilized for active surge control. While such active surge components are generally effective in controlling surge and rotating stall, they add extra weight, require additional components, and in many instances impart a penalty on the efficiency of the compression system.

Thus, a compression system and methods of operating the same that address one or more of the challenges noted above would be useful.

BRIEF DESCRIPTION

Aspects and advantages of the invention will be set forth in part in the following description, or may be obvious from the description, or may be learned through practice of the invention.

In one aspect, the present disclosure is directed to a turbine engine. The turbine engine includes a compressor configured to pressurize an incoming air stream into a pressurized air stream. The turbine engine also includes a combustion chamber fluidly connected with the compressor and configured to receive the pressurized air stream from the compressor, wherein fuel is injected into the pressurized air stream and ignited in the combustion chamber so as to raise a temperature and energy level of the pressurized air stream. Further, the turbine engine includes a turbine fluidly connected with the combustion chamber and configured to receive combustion products that flow from the combustion chamber. The turbine engine also includes a shaft system and an electric generator operatively coupled with the compressor via the shaft system. Moreover, the turbine engine includes one or more electrical loads electrically connectable with the electric generator via a power bus system. In addition, the turbine engine includes a controller configured to: receive control data indicative of a system state of the compressor; determine a damping control command representative of instructions for adjusting a control parameter of at least one of the electric generator and the one or more electrical loads based at least in part on the control data; and control at least one of the electric generator and the one or more electrical loads to adjust the control parameter based at least in part on the damping control command to change an output of the shaft system for damping instability fluctuations of the pressurized air stream within the compressor.

In another aspect, the present disclosure is directed to a method for active stability control of a compression system operatively coupled with an electric generator via a shaft system. The method includes receiving control data indicative of a system state of the compression system. The method also includes determining a damping control command representative of instructions for adjusting a control parameter of at least one of the electric generator and one or more electrical loads electrically connectable with the electric generator based at least in part on the control data. Further, the method includes adjusting the control parameter of at least one of the electric generator and the one or more electrical loads based at least in part on the damping control command to change an output of the shaft system for damping instability fluctuations of a fluid stream within the compression system.

In yet another aspect, the present disclosure is directed to a compression system. The compression system includes a pump configured to pressurize a fluid stream. The compression system also includes a shaft system and an electric machine operatively coupled with the pump via the shaft system. The compression system further includes a controller configured for controlling the electric machine and configured to: receive one or more compression system parameters indicative of a system state of the pump; and control a torque output of the electric machine to dampen pressure fluctuations of the fluid stream based at least in part on the system state of the pump.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
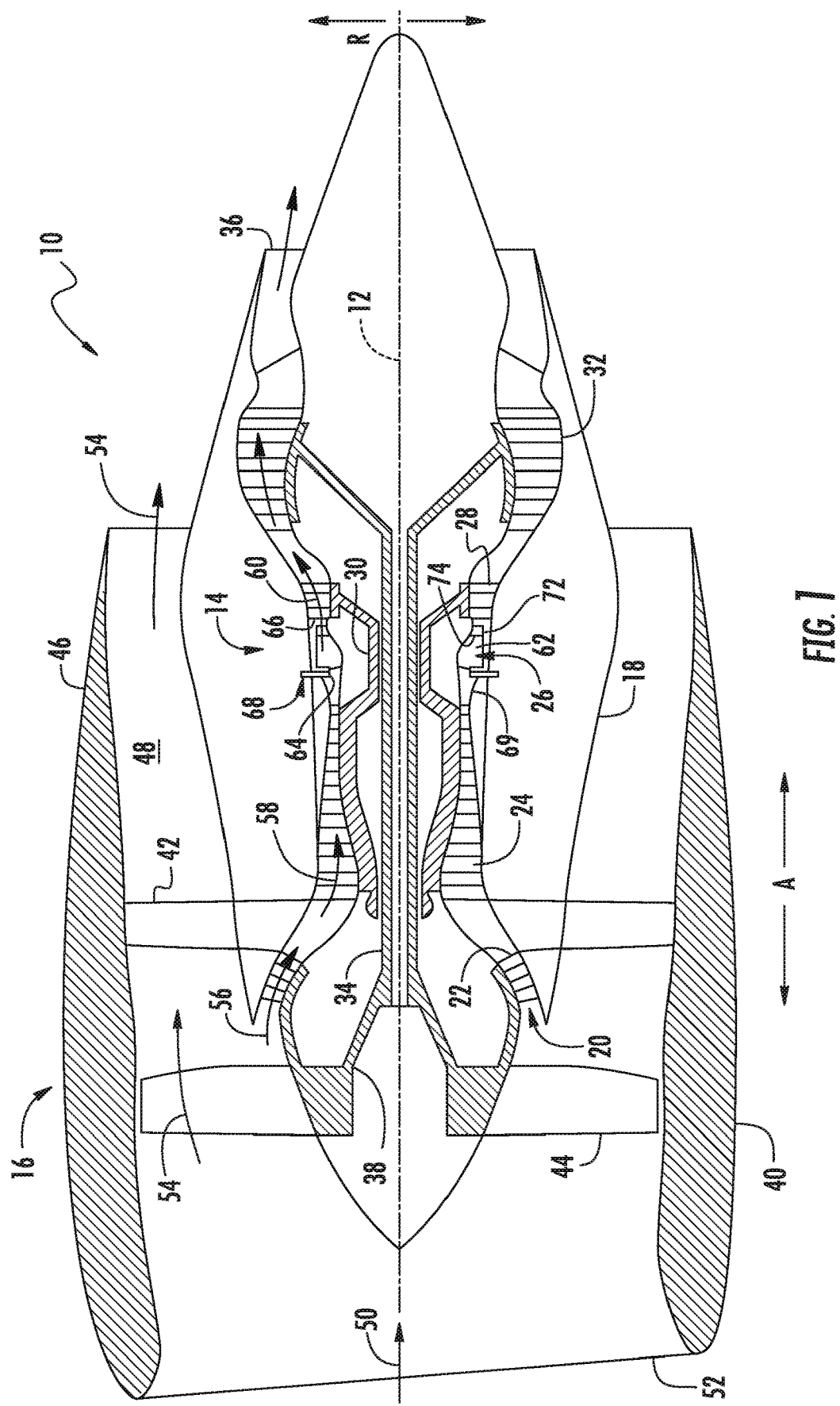
FIG. 1 provides a schematic cross-sectional view of an exemplary gas turbine engine in accordance with exemplary aspects of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference. Furthermore, as used herein, terms of approximation, such as "approximately," "substantially," or "about," refer to being within a fifteen percent (15%) margin of error unless otherwise stated.

Generally, the present disclosure is directed to systems and methods for active stability control of rotating compression systems utilizing an electric machine operatively coupled thereto. In one exemplary aspect, an electric machine operatively coupled with a compression system, e.g., via a shaft system, is controlled to provide shaft damping for instability fluctuations of the pressurized fluid stream within the compression system. That is, based on control data indicative of a system state of the compression system (e.g., pressure and/or mass flow through the compression system), a control parameter (e.g., speed, torque, power) of the electric machine is adjusted to control or change an output of the shaft system. For instance, in embodiments in which the electric machine is an electric generator, a control parameter of the electric generator is adjusted so that the torque load that the electric generator placed on the shaft system is changed, which in turn adjusts the output of the shaft system, e.g., shaft speed or torque. In some embodiments, a control parameter of one or more electrical loads electrically connected to the electric generator may be adjusted to change the electrical load on the electric generator, which in turn adjusts the output of the shaft system. In embodiments in which the electric machine is an electric motor, a control parameter of the electric motor is adjusted so that the torque output of the electric motor is changed, which in turn adjusts the output of the shaft system. Adjusting the shaft system output by adjusting one or more control parameters of the electric machine allows the compression system to operate closer to the stall line, reduces the stall margin needed, reduces the reliance on or completely eliminates the need for variable geometry components, and provides a number of other benefits as discussed herein. A method for active stability control of a compression system operatively coupled with an electric machine via a shaft system is also provided.

FIG. 1 provides a schematic cross-sectional view of an exemplary high-bypass turbofan type engine 10 herein referred to as "turbofan 10" as may incorporate various embodiments of the present disclosure. As shown in FIG. 1, the turbofan 10 defines an axial direction A, a radial direction R, and a circumferential direction. Moreover, the turbofan 10 defines an axial centerline or longitudinal axis 12 that extends therethrough for reference purposes. In general, the axial direction A extends parallel to the longitudinal axis 12, the radial direction R extends orthogonally to or from the longitudinal axis 12, and the circumferential direction extends concentrically around the longitudinal axis 12.

As shown, the turbofan 10 includes a core gas turbine engine 14 and a fan section 16 positioned upstream thereof. The core engine 14 typically includes a generally tubular outer casing 18 that defines an annular core inlet 20. The outer casing 18 further encloses and supports a low pressure compressor or booster 22 for pressurizing the air that enters core engine 14 through core inlet 20. A high pressure, multi-stage, axial-flow compressor 24 receives pressurized air from the booster 22 and further increases the pressure of the air. The pressurized air stream flows downstream to a combustor 26 where fuel is injected into the pressurized air stream and ignited to raise the temperature and energy level of the pressurized air. The high energy combustion products flow from the combustor 26 to a high pressure turbine 28 for driving the high pressure compressor 24 through a high pressure shaft 30. The high energy combustion products flow then flow to a low pressure turbine 32 for driving the booster 22 and the fan section 16 through a low pressure shaft 34 that is coaxial with the high pressure shaft 30. After driving each of the turbines 28 and 32, the combustion products exit the core engine 14 through an exhaust nozzle 36 to produce propulsive thrust.

The fan section 16 includes a rotatable, axial-flow fan rotor 38 that is surrounded by a nacelle or annular fan casing 40. The fan casing 40 is supported by the core engine 14 by a plurality of substantially radially-extending, circumferentially-spaced outlet guide vanes 42. In this way, the fan casing 40 encloses the fan rotor 38 and a plurality of fan blades 44. The downstream section 46 of the fan casing 40 extends over an outer portion of the core engine 14 to define a bypass passage 48 that provides additional propulsive thrust.

During operation of the turbofan 10, an initial or incoming airflow, represented by arrow 50, enters the turbofan 10 through an inlet 52 defined by the fan casing 40. The airflow 50 passes through the fan blades 44 and splits into a first air flow (represented by arrow 54) that moves through the bypass passage 48 and a second air flow (represented by arrow 56) which enters the booster 22 through the core inlet 20.

The pressure of the second airflow 56 is progressively increased by the booster 22 and then enters the high pressure compressor 24, as represented by arrow 58. The discharged pressurized air stream flows downstream to the combustor 26 where fuel introduced to generate combustion gases or products. The combustion products 60 exit the combustor 26 and flow through the high pressure turbine 28. The combustion products 60 then flow through the low pressure turbine 32 and exit the exhaust nozzle 36 to produce thrust. Moreover, as noted above, a portion of the incoming airflow 50 flows through the bypass passage 48 and through an exit nozzle defined between the fan casing 40 and the outer casing 18 at the downstream section 46 of the fan casing 40. In this way, substantial propulsive thrust is produced.

As further shown in FIG. 1, the combustor 26 defines an annular combustion chamber 62 that is generally coaxial with the longitudinal centerline axis 12, as well as an inlet 64 and an outlet 66. The combustor 26 receives an annular stream of pressurized air from a high pressure compressor discharge outlet 69. A portion of this compressor discharge air ("CDP" air) flows into a mixer (not shown). Fuel is injected from a fuel nozzle 68 to mix with the air and form a fuel-air mixture that is provided to the combustion chamber 62 for combustion. Ignition of the fuel-air mixture is accomplished by a suitable igniter, and the resulting combustion gases 60 flow in an axial direction toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the high pressure turbine 28. As shown in FIG. 1, the high pressure turbine 28 preferably rotates the high-pressure compressor 24 via the high pressure shaft 30. The low-pressure turbine 32 preferably drives the booster 22 and the fan rotor 38 via the second drive shaft 34.

The combustion chamber 62 is housed within engine outer casing 18. Fuel is supplied into the combustion chamber by one or more fuel nozzles. Liquid fuel is transported through conduits or passageways within a stem of each fuel nozzle. Further, the turbofan 10 may use natural gas, various types of syngas, and/or other types of fuels. Moreover, the turbofan 10 may have different configurations and may use other types of components in addition to those components shown. Multiple gas turbine engines, other types of turbines, and other types of power generation equipment also may be used herein together. Moreover, although turbofan engine 10 has been described and illustrated in FIG. 1, the subject matter of the present disclosure may apply to or be incorporated with other suitable types of turbine engines, such as steam and gas turbine engines. Example gas turbine engines may include turbojets, turboprop, turboshaft, aeroderivatives, auxiliary power units, etc.

Figure 2:
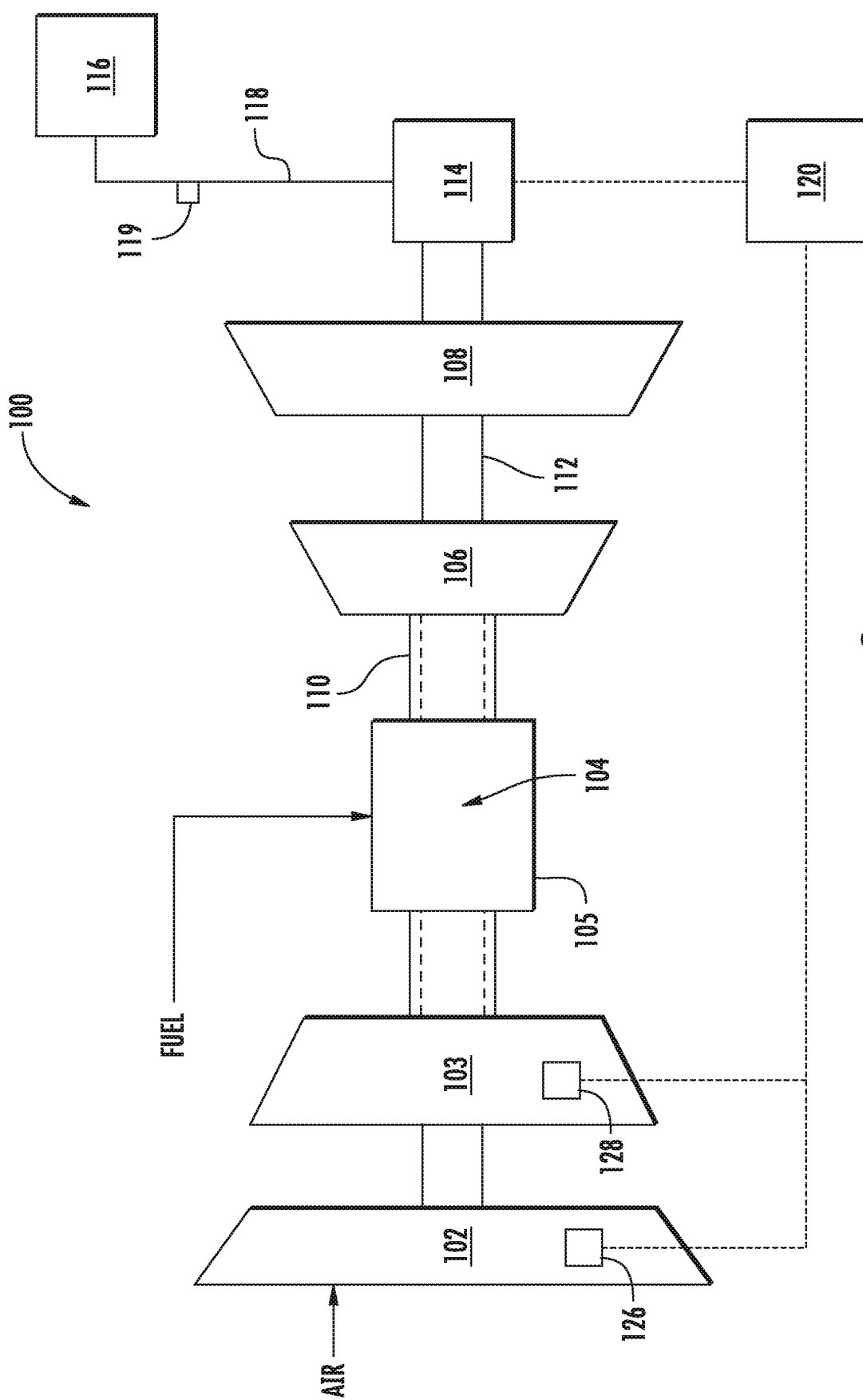
FIG. 2 provides a schematic view of an exemplary gas turbine engine assembly in accordance with exemplary aspects of the present disclosure.

FIG. 2 provides a schematic view of an exemplary gas turbine engine 100 in accordance with exemplary aspects of the present disclosure. The gas turbine engine 100 includes a low pressure compressor or booster 102 and a high pressure compressor 103 positioned downstream of the booster 102. The booster 102 and the high pressure compressor 103 are each configured to pressurize an incoming air stream into a pressurized air stream. The incoming air stream may be progressively compressed or pressurized as it flows downstream through the booster 102 and the high pressure compressor 103. The booster 102 and the high pressure compressor 103 are axial compressors. In some embodiments, the high pressure compressor may be a radial or centrifugal compressor. The centrifugal compressor may include an impeller. The gas turbine engine 100 also includes a combustor 105 defining a combustion chamber 104. The combustion chamber 104 is fluidly connected with the compressors 102, 103 and is configured to receive the pressurized air stream after the pressurized air stream flows downstream through the compressors 102, 103. Fuel is injected into the combustion chamber 104 so that the pressurized air stream discharged therein is ignited to raise a temperature and energy level of the pressurized air stream, e.g., to create combustion gases or products.

The gas turbine engine 100 also includes a high pressure turbine 106 downstream of the combustor 105 and a low pressure turbine 108 downstream of the high pressure turbine 106. The high pressure turbine 106 and the low pressure turbine 108 are each fluidly connected with the combustion chamber 104 and are configured to receive combustion products that flow from the combustion chamber 104. The gas turbine engine 100 also includes a shaft system, including a high pressure shaft 110 and a low pressure shaft 112. In the depicted embodiment of FIG. 2, the high pressure shaft 110 is coaxial with the low pressure shaft 112. The high pressure shaft 110 operatively couples the high pressure turbine 106 with the high pressure compressor 103. When the stator vanes and rotor blades of the high pressure turbine 106 extract energy from the combustion gasses, the high pressure shaft 110 is driven about its axis of rotation, which in turn drivingly rotates the high pressure compressor 103. Similarly, the low pressure shaft 112 operatively couples the low pressure turbine 108 with the low pressure compressor 102. When the stator vanes and rotor blades of the low pressure turbine 108 extract energy from the combustion gasses, the low pressure shaft 112 is driven about its axis of rotation, which in turn drivingly rotates the low pressure compressor 102.

Additional components may be operatively coupled with the high and/or low pressure shafts 110, 112. As one example, a fan rotor 38 operatively configured to drive fan blades 44 may be operatively coupled with the low pressure shaft 110, e.g., as shown in FIG. 1. As another example, as shown in the depicted embodiment of FIG. 2, an electric generator 114 is operatively coupled with the low pressure shaft 110. In this way, the electric generator 114 is also operatively coupled with the low pressure turbine 108, and notably, the booster 102. The generator 114 may be any type of device for the generation of electrical power. Particularly, the generator 114 is configured to generate electrical power when driven by the torque source, or in this example embodiment, the gas turbine engine 100. Additionally or alternatively, in some embodiments, an electric generator is operatively coupled with the high pressure shaft 110. In this way, in such embodiments, the electric generator is also operatively coupled with the high pressure turbine 106, and notably, the high pressure compressor 103. Further, in some embodiments, the electric generator 114 may include a rotor shaft that is operatively coupled with the low pressure shaft 112 or the high pressure shaft 110.

Figure 3:
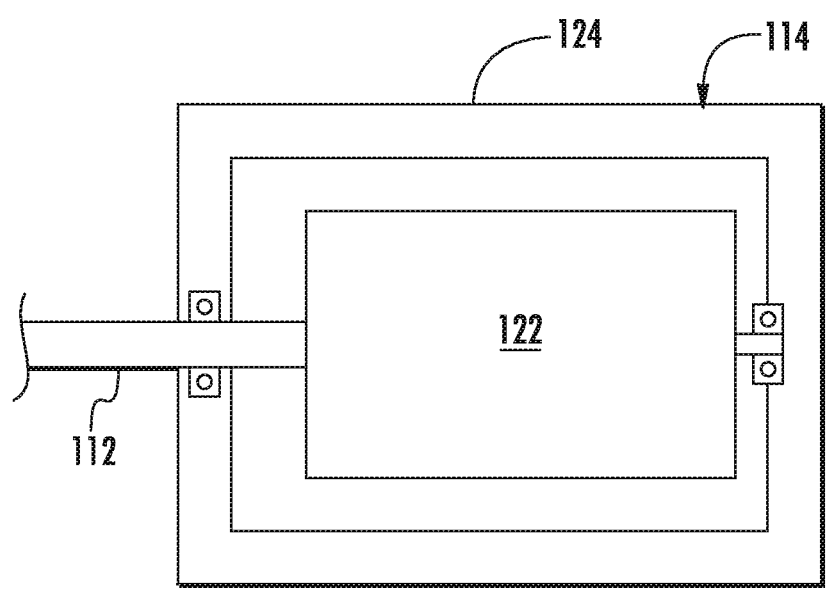
FIG. 3 provides a schematic view of an electric generator of the gas turbine engine assembly of FIG. 2.

FIG. 3 provides a schematic view of the electric generator 114 of FIG. 2. As shown in FIG. 3, the electric generator 114 includes a generator rotor 122 that rotates within a generator stator 124 about an axis of rotation. The generator rotor 122 is operatively coupled with the low pressure shaft 112. The generator rotor 122 is driven about its axis of rotation in part by the low pressure shaft 112 and in part by the interaction between the windings and/or magnetic fields of the generator rotor 122 and generator stator 124. The rotation of the generator rotor 122 causes the electric generator 114 to generate electrical power in a manner understood by those skilled in the art. Further, the rotation of the generator rotor 122 places a torque load on the shaft system or low pressure shaft 112 in this example. Adjustment of the torque load on the shaft system causes the rotational speed of the shaft system to change. In some embodiments, as noted above, the electric generator 114 may be operatively coupled with an electrical generator shaft that is operatively coupled with the low pressure shaft 112.

Returning to FIG. 2, as shown, one or more electrical loads 116 are electrically connectable with the electric generator 114, e.g., for receiving electrical power therefrom. The one or more electrical loads 116 may include vehicle systems (e.g., avionics, air conditioning units, lights, pumps, etc.), an electric motor for driving one or more propulsors (e.g., for a hybrid electric propulsion system), some combination thereof, energy storage devices, etc. The electric generator 114 is electrically connectable to the one or more electrical loads 116 through one or more wired or wireless communication lines of a power bus system 118. For example, the power bus system 118 may include various switches or other power electronics movable to selectively electrically connect the various electrical loads 116 with the electric generator 114. Additionally, the power bus system 118 may further include power electronics, such as inverters, converters, rectifiers, etc., for conditioning or converting electrical power (e.g., from AC to DC or vice versa), and further for modifying an amount of electrical power provided to, or extracted from various electrical loads 116 electrically connected to the electric generator 114.

In addition, as shown in FIG. 2, the gas turbine engine 100 includes a controller 120 configured for controlling the electric generator 114 and/or the one or more electrical loads 116 electrically connected to the electric generator 114, as well as other components on power bus system 118, such as controllable sources 119 (control elements, switches, etc.). For this embodiment, the controller 120 is configured to perform one or more operations or functions for active stability control of one or both compressors 102, 103 of the gas turbine engine 100, e.g., to account for rotating stall and surge. The controller 120 may be configured in substantially the same manner as the exemplary computing system 500 described below with reference to FIG. 12 (and may be configured to perform one or more of the functions of the exemplary method (400) described herein). The controller 120 may be a system of controllers or a single controller. The controller 120 may be a stand-alone controller dedicated to active stability control of the compressors 102, 103 or may be a general purpose controller. For instance, in some embodiments, the controller 120 may be a controller dedicated to controlling the electric generator 114. In some embodiments, the controller 120 may be an engine controller. The controller 120 may be, for example, an Electronic Engine Controller (EEC) or an Electronic Control Unit (ECU) equipped with Full Authority Digital Engine Control (FADEC).

In accordance with exemplary aspects of the present disclosure, an electric generator operatively coupled with a compressor via a shaft system is utilized to provide stability control for one or more compressors, or more broadly the compression system. In particular, one or more control parameters of the electric generator (e.g., speed, torque, power, voltage) may be adjusted to change an output of the shaft system, e.g., shaft speed. Additionally or alternatively, one or more control parameters of the one or more electrical loads electrically connected to the electric generator (or other controllable sources on the power bus system) may be adjusted to change an output of the shaft system, e.g., shaft speed. The adjustment of the output of the shaft system ultimately changes the rotational speed of the compressor (e.g., the rotating compressor blades). The relatively small adjustments in the shaft system output may be utilized for damping instability fluctuations of the pressurized air stream within or flowing through the compressor, such as rotating stall and surge.

By way of example, for the depicted embodiment of FIG. 2, the electric generator 114 is used for stability control of the air flow within the low pressure compressor or booster 102 (and may also provide stability control for the high pressure compressor 103). As noted above, one or more control parameters of the electric generator 114 (e.g., speed, torque, power) may be adjusted to change an output of the shaft system, e.g., shaft speed. The control parameters of the electric generator 114 are adjusted based at least in part on control data indicative of a system state of the compressor 102. The adjustment of the output of the shaft system may be used for damping instability fluctuations of the pressurized air stream within the compressor 102, and accordingly, rotating stall and surge may be controlled. The controller 120 may control the various aspects of the active stability control system as described further below.

More particularly, to provide active stability control for the booster 102, the controller 120 is configured to receive control data indicative of a system state of the compressor 102. The controller 120 may receive control data for each time step of the controller 120, at predetermined intervals, etc. The system state of the compressor 102 may be indicated by one or more of the following compressor parameters: the mass flow of the air stream flowing through the compressor 102 (e.g., at the upstream inlet and/or the downstream outlet), the pressure fluctuations of the air stream flowing through the compressor 102, and the rotational speed of the low pressure shaft 112. Other compressor parameters indicative of the state of the compressor may likewise be included in the control data. One or more sensors 126, 128 positioned along the compressor 102, 103, respectively, may sense or measure the one or more compressor parameters. Once sensed or measured, one or more signals may be routed from the one or more sensors 126, 128 to the controller 120 for processing.

Figure 4:
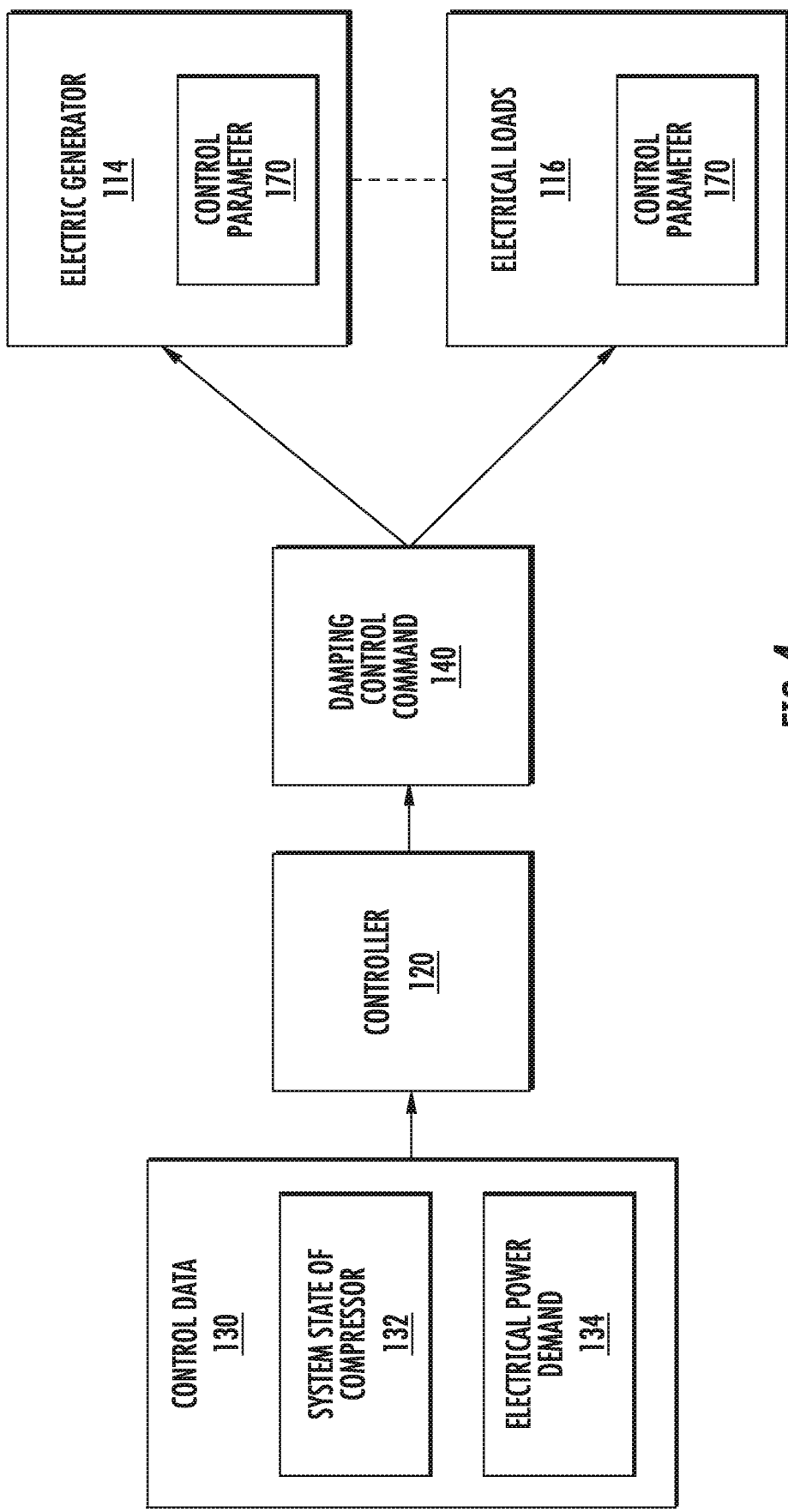
FIG. 4 provides a flow diagram depicting various inputs and an output of a controller of the gas turbine engine of FIG. 2 in accordance with an exemplary embodiment of the present disclosure.

FIG. 4 provides a flow diagram depicting various inputs and an output of the controller 120 in accordance with an exemplary embodiment of the present disclosure. As shown in FIG. 4, the controller 120 receives control data 130 indicative of a system state 132 of the compressor 102 (FIG. 2). For instance, the controller 120 can directly or indirectly receive the control data 130 from the one or more sensors 126 (FIG. 2). Once received, the control data 130 may be filtered and processed. For instance, the control data 130 may be used to calculate or estimate various compressor parameters, e.g., mass flow.

Based at least in part on the control data 130, the controller 120 is configured to determine and generate a damping control command 140 representative of instructions for adjusting a control parameter 170 of at least one of the electric generator 114 and the one or more electrical loads 116 electrically connectable with the electric generator 114. For instance, if the control data 130 indicates that the system state of the compressor 102 is such that the amplitude of the pressure and/or mass flow fluctuations of the pressurized air stream render the flow unstable, the controller 120 determines the appropriate damping response to dampen such fluctuations. In this way, the compressor operates in a more stable fashion. The damping control command 140 may be determined as explained further below.

As noted above, the damping control command 140 may be representative of instructions for adjusting one or more control parameters 170 of the electric generator 114. For instance, the control parameter 170 may be a speed output of the electric generator 114, or more particularly, a speed of the generator rotor of the electric generator 114. The control parameter 170 may also be a torque output of the electric generator 114. Further, the control parameter 170 may be a power output of the electric generator 114. In addition, the control parameter 170 may be a voltage output of the electric generator 114. Further, the damping control command 140 may be representative of instructions for adjusting one or more control parameters 170 of one or more electrical loads 116 electrically connectable with the electric generator 114, e.g., via power bus system 118. The damping command 140 may be representative of instructions for directly adjusting a control parameter 170 of an electrical load 116 or may be representative of instructions for indirectly adjusting a control parameter 170 of an electrical load 116, such as by a controllable source 119 (FIG. 2) or element positioned on the power bus system 118. For instance, the control parameter 170 may be an amount of electrical power that one or more of the electrical loads 116 draw from the electric generator 114. To indirectly control the amount of electrical power provided to the electrical load 116, a controllable source or switch may be used to switch or modulate the electrical load 116 "off" and "on" to change the electrical power load on the electric generator 114. To directly control the amount of electrical power provided to the electrical load 116 (e.g., an energy storage device), the electrical load 116 may itself be controlled to draw varying amounts of electrical power from the electric generator 114. The control parameter 170 may be other suitable parameters as well.

The controller 120 is further configured to control at least one of the electric generator 114 and the one or more electric loads 116 to adjust the control parameter 170 (which may be one or more control parameters) based at least in part on the damping control command 140 to change an output of the shaft system for damping instability fluctuations of the pressurized air stream within the compressor 102. For instance, once the damping control command 140 is determined based on the control data 130 by the controller 120, one or more control parameters 170 of the electric generator 114 and/or the electrical loads 116 electrically connected thereto may be adjusted. When the one or more control parameters 170 of the electric generator 114 are adjusted, the torque load on the shaft system is changed and consequently the output of the shaft system is changed as well. For this embodiment, the output of the low pressure shaft 112 is adjusted. That is, the shaft speed of the low pressure shaft 112 is changed. Particularly, when the shaft speed of the low pressure shaft 112 is changed, the instability fluctuations of the pressurized air stream within the compressor 102 may be dampened.

Figure 5:
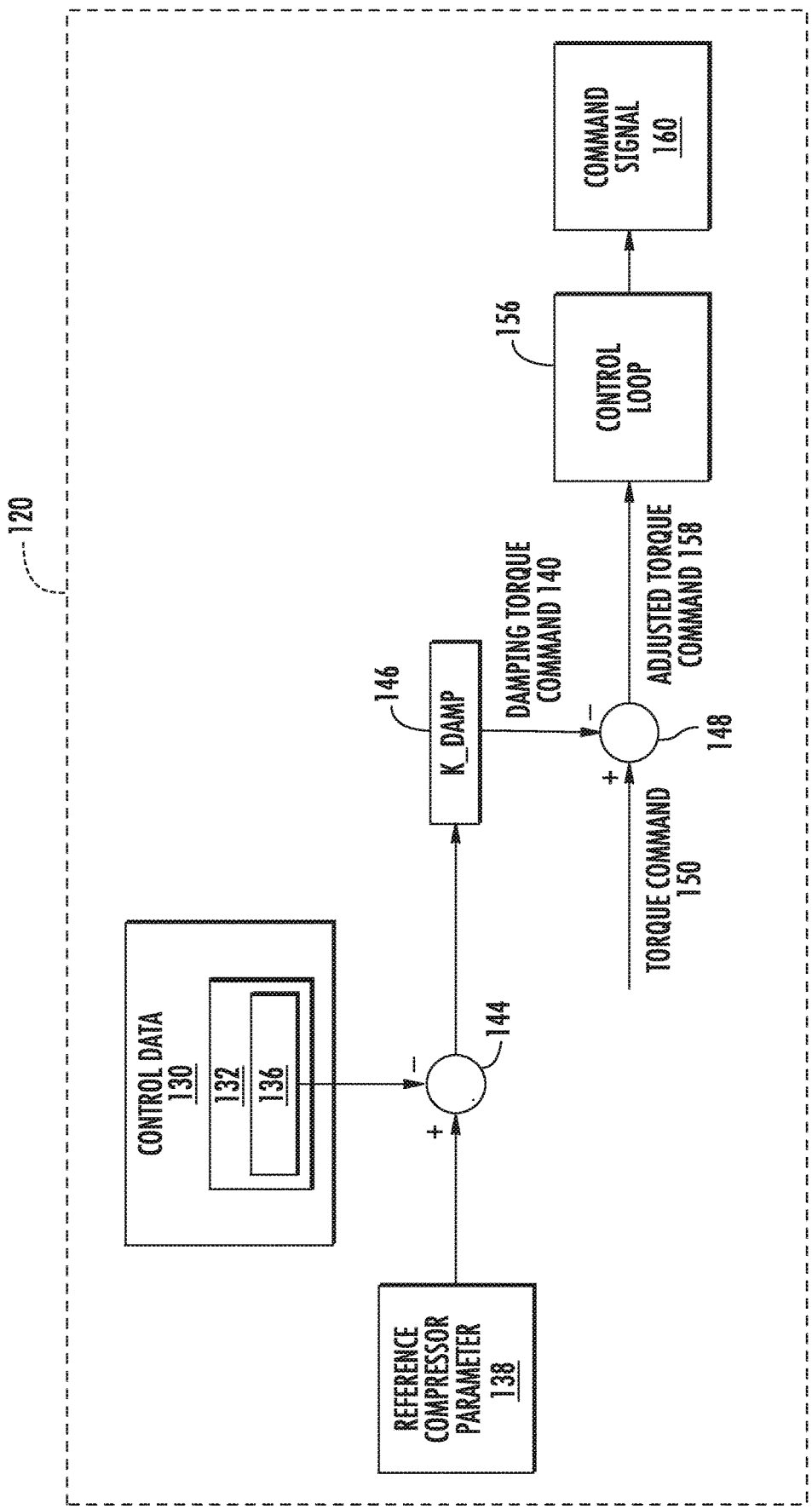
FIG. 5 provides an exemplary block diagram of one exemplary manner in which a control parameter of an electric generator may be adjusted in accordance with an exemplary embodiment of the present disclosure.

FIG. 5 provides an exemplary block diagram of one exemplary manner in which the control parameter 170 of the electric generator 114 may be adjusted in accordance with an exemplary embodiment of the present disclosure. As shown in FIG. 5, the control data 130 indicative of the system state 132 of the compressor includes one or more measured or estimated compressor parameters (collectively "measured compressor parameters 136"), such as the mass flow of the air stream flowing through the compressor (e.g., at the upstream inlet and/or at the downstream outlet), the pressure of the air stream flowing through the compressor, and/or the rotational speed of one or more of the shafts operatively coupling the electric machine with the compressor. As depicted, the measured compressor parameter 136 is input into a summation block 144. A reference compressor parameter 138 is likewise input into the summation block 144. The value of the reference compressor parameter 138 is based at least in part on the operating point of the compressor. That is, the value of the reference compressor parameter 138 is input based on the predicted or modeled value at the particular operating point at which the compressor is being operated. For instance, for a particular speed setting of the core of the gas turbine engine as well as the settings of other parameters, the reference compressor parameter has an expected or modeled value at that particular operating point and such value is input into the system at that operating point. The reference compressor parameter 138 may be the expected mass flow of the air stream flowing through the compressor, the expected pressure of the air stream flowing through the compressor, and/or the expected rotational speed of one or more of the shafts operatively coupling the electric machine with the compressor. At the summation block 144, the measured compressor parameter 136 is subtracted from the reference compressor parameter 138. For example, the measured mass flow may be subtracted from the reference mass flow. As another example, the measured pressure may be subtracted from the reference pressure. As yet another example, the measured rotational speed of the compressor may be subtracted from the reference rotational speed of the compressor. The difference of the operation at the summation block 144 is forwarded to a gain block 146 where the gain of the system is determined. The gain of the system is the damping control command, which for this embodiment is a damping torque command 140. The damping torque command 140 is forwarded to a summation block 148 where the damping torque command 140 is subtracted from a control command, which for this embodiment is a torque command 150. In short, the damping torque command 140 is utilized to adjust the torque command 150 as will be explained further below.

As further shown in FIG. 5, the generated torque command 150 is forwarded to the summation block 148. The one or more controllers can generate the control command, which is the torque command 150 in this embodiment, based at least in part on a rotational speed of the compressor. In other embodiments, the one or more controllers can generate the control command based at least in part on a parameter indicative of the rotational speed of the compressor, such as electric generator speed. In some applications, the power setting of the turbine engine determines the fuel flow to the combustion chamber 104 (FIG. 2), which in turn sets the rotational speed of the compressor. Thus such parameters can be utilized to ultimately generate the control command (e.g., torque command 150). such asAt the summation block 148, the damping torque command 140 is subtracted from the torque command 150. The difference of this operation is forwarded to a control loop 156 as an adjusted control command, which for this embodiment is an adjusted torque command 158. Based on the adjusted torque command 158, the control loop 156 generates a command signal 160. The command signal 160 is used to adjust the control parameter 170 (FIG. 4) of the electric generator 114 (FIG. 2) so that the torque load that the electric generator 114 places on the shaft is adjusted such that the output of the shaft system may be adjusted. The adjustment of the shaft system, e.g., shaft speed, is used for damping flow instability of the compressor. It will be appreciated that FIG. 5 provides one exemplary manner in which a control parameter of the electric generator may be adjusted and that other control methods are possible.

Further, in some embodiments, with reference to FIGS. 2 and 4, the control data 130 received by the controller 120 further includes an electrical power demand 134 placed on the electric generator 114 by one or more electrical loads 116 electrically connected with the electric generator 114. In such embodiments, the electric generator 114 is controlled to adjust the control parameter 170 based at least in part on the electrical power demand 134. Notably, by taking into account the electrical power demand 134 of the electrical loads 116 on the electric generator 114, a number of advantages are realized. For instance, in some instances, if damping the compressor instability with the electric generator 114 operatively coupled thereto is needed, the control parameter 170 of the electric generator 114 may not need to be adjusted or at least may not need to be adjusted to the degree or extent that it would otherwise need to be adjusted due to a change in the electrical load on the electric generator 114. For example, one or more electrical loads 116 may demand more or less power at a particular point in time or may become electrically connected to or electrically disconnected from the electrical generator 114. When this occurs, the electrical load on the electric generator 114 changes rapidly, which like adjustment of the control parameter 170 of the electric generator 114, causes a change in the torque load that the electric generator 114 places on the shaft system. Thus, the electrical load on the generator 114 also adjusts the output of the shaft system, e.g., the shaft speed of the low pressure compressor 112. Accordingly, in such embodiments, the controller 120 takes into account the system state 132 of the compressor and the electrical power demand 134 of the control data 130 and may adjust the one or more control parameters 170 of the electric generator 114 accordingly.

Furthermore, by taking into account the electrical power demand 134 of the electrical loads 116 on the electric generator 114, the controller 120 can ensure that the electric generator 114 can meet the power demanded by the electrical loads 116 electrically connected thereto. That is, the electric generator 114 must meet the average power of the electric loads 116 connected thereto. For instance, if the electrical generator 114 is providing electrical power to an electric motor driving a propulsor of a hybrid electric propulsion system for an aerial vehicle, it is imperative that the power demands of the electric motor are met by the electric generator 114. In such a situation, the control parameter 170 of the electric generator 114 may not be adjusted if the demanded power of the electric motor is not being met or if such an adjustment would cause thrust instability. In such instances, the controller 120 can control other actuating systems, such as bleed or throttle valves, to actively control the flow instability in the compressor until use of the electric generator 114 for shaft damping may be safely utilized. Further, in some instances, the controller 120 may prioritize the electrical loads and the damping response provided by electric generator 114 and/or electrical loads 116 electrically connected thereto to optimize instability damping whilst not sacrificing safe transport. Further, by taking into account the electrical power demand 134 of the electrical loads 116 on the electric generator 114, the quality of the electrical power received by the electrical loads 116 by the electric generator may be better maintained. The damping action may be a small percentage of the rated torque. For instance, in some embodiments, the damping action may be less than ten percent (10%) of the rated torque.

Figure 6:
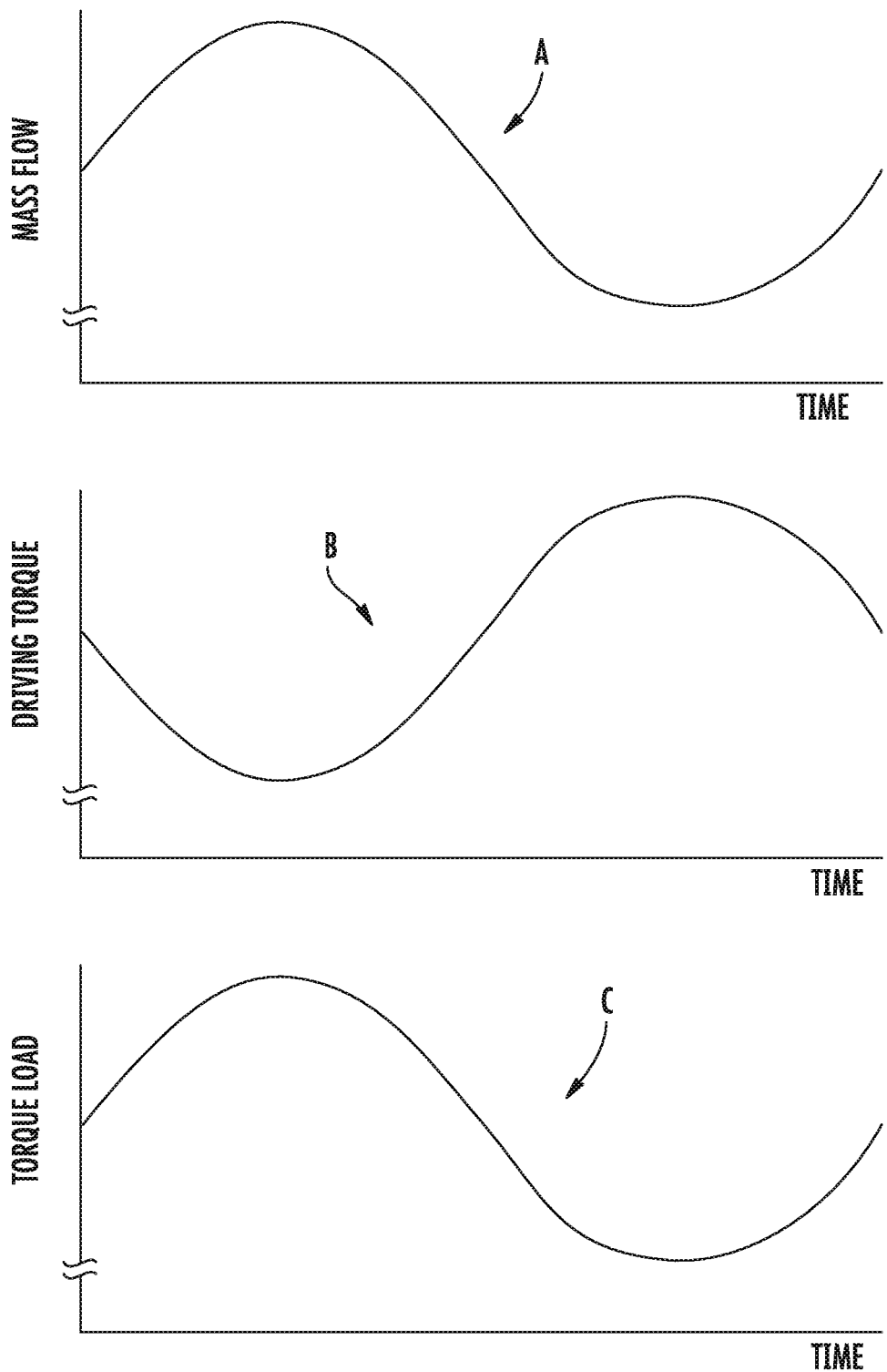
FIG. 6 provides a chart depicting an example damping response to a flow instability in a compressor of a gas turbine engine in accordance with exemplary aspects of the present disclosure.

FIG. 6 provides a chart depicting an example damping response to a flow instability in the compressor 102 (FIG. 2) in accordance with exemplary aspects of the present disclosure. As shown in FIG. 6, Graph A depicts a mass flow fluctuation of the compressor 102 as a function of time, Graph B depicts the driving torque of the system as a function of time, where the driving torque is equal to the generator torque subtracted from the turbine torque (i.e., the torque generated by the turbine engine), and Graph C depicts the torque load that the electric generator 114 (FIG. 2) places on the shaft system as a function of time. As noted above, the torque load on the shaft system may be adjusted by adjusting or more control parameters of the electric generator 114, e.g., generator torque, speed, power, or voltage, or by adjusting a control parameter of one or more electrical loads electrically connected to the electric generator. As shown by comparing Graph A, Graph B, and Graph C of FIG. 6, the torque load placed on the shaft system fluctuates to counteract or dampen the mass flow fluctuations during a flow instability within the compressor 102. More particularly, the torque load placed on the shaft system by the electric generator 114 or by one or more electrical loads 116 electrically connected thereto may be adjusted such that the torque load on the turbine engine (which in turn cause shaft speed adjustments) is in phase with the mass flow fluctuations of the pressurized air stream within the compressor 102, which is depicted best by comparing Graph A and Graph C. In this way, fluctuations in the total driving torque as depicted in Graph B are or are about one hundred eighty degrees (180°) out of phase with the mass flow fluctuations depicted in Graph A. In this manner, the instability fluctuations of the compressor 102 may be dampened. For a motor driving a compressor or pump, the fluctuations in the driving torque are or are about one hundred eighty degrees (180°) out of phase with the mass flow fluctuations which need damped. "About" in this context means within fifteen degrees (15°) of the stated value.

Further, in some embodiments, due to system dynamics, a different phase relationship between the torque load adjustments and the mass flow fluctuations may be selected. Such alternative phase relationships may be determined and applied as part of the control system. For instance, the torque load placed on the shaft system by the electric generator 114 and/or electrical loads 116 electrically connected thereto may be adjusted such that the torque load fluctuations on the engine (which in turn cause shaft speed adjustments) are or are about forty-five degrees (45°) out of phase with the mass flow fluctuations of the pressurized air stream within the compressor 102. Such a phase lag or offset may be set such that unintended lags in the control system, lags in generator and power system physics, and lags in the fluid and rotation system may be accounted for so that ultimately the driving torque fluctuations are in practice one hundred eighty degrees (180°) out of phase with the mass flow fluctuations.

A number of advantages are realized by damping compressor instability with an electric generator operatively coupled thereto. For instance, due to the high control bandwidth of electric generators to respond to active damping commands, the compressors may be operated closer to or stably in the stall region (i.e., left of the stability control line or stability margin). The ability to operate closer to the stall line allows for less stall margin and allows the compressor and overall turbine engine to be operated at a more aerodynamically or thermodynamic efficient point. An example is provided below.

Figure 7:
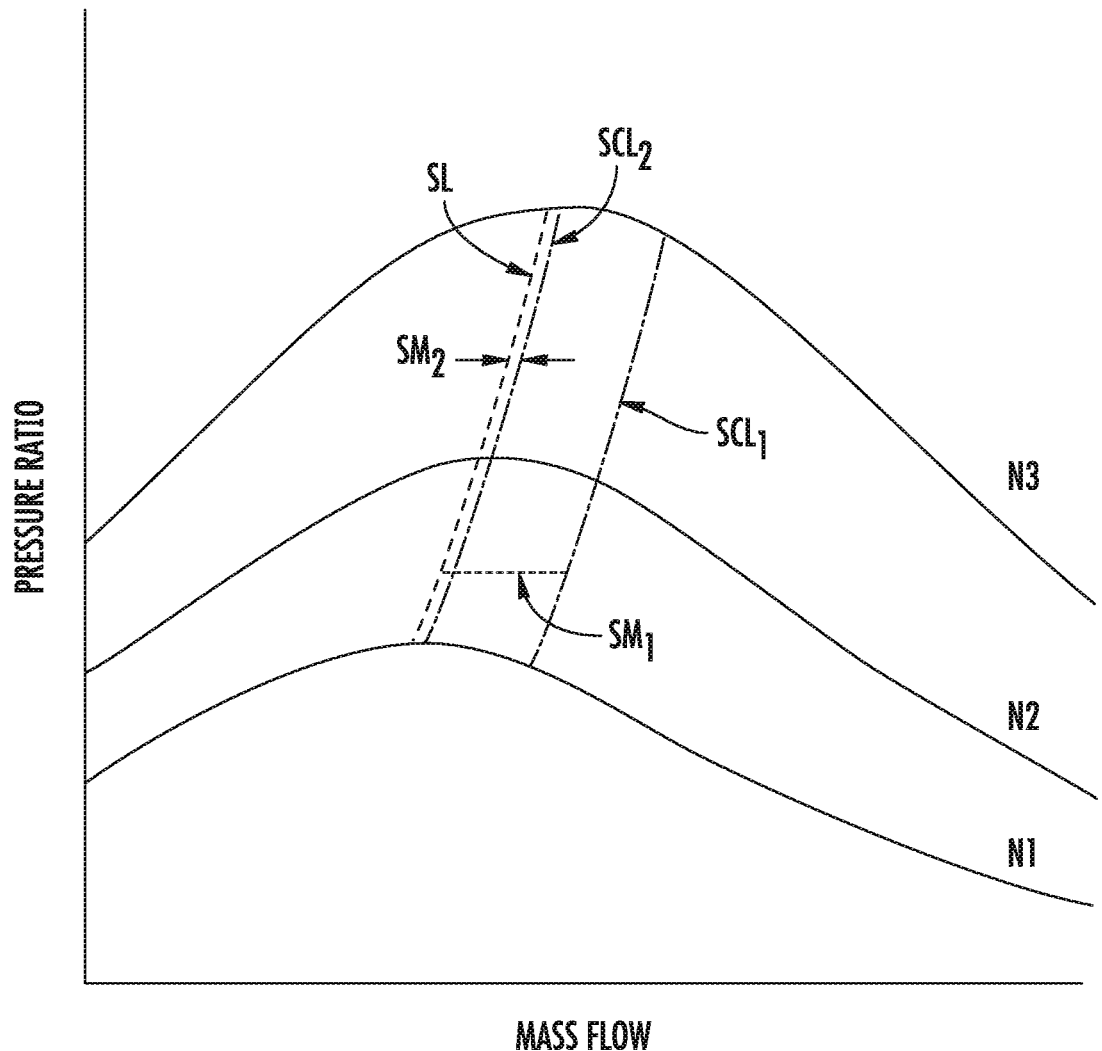
FIG. 7 provides an exemplary compressor map depicting various characteristic curves of a compressor in accordance with exemplary embodiments of the present disclosure.

FIG. 7 provides an exemplary compressor map depicting various characteristic curves of a compressor in accordance with exemplary embodiments of the present disclosure. For this embodiment, the characteristic curves N1, N2, and N3 are drawn for various core speeds of the turbine engine. The compressor map also depicts the stall line SL. The right side of the stall line SL is the stable operating region and the left side of the stall line SL is an unstable operating region. Prior to implementation of utilizing the electric generator for shaft damping of instability fluctuations, an initial stall control line $SCL_1$ was drawn a distance from the stall line SL in the stable operating region. The distance between the stall line SL and the initial stall control line $SCL_1$ was defined as the initial stall margin $SM_1$. In utilizing the electric generator for shaft damping of instability fluctuations within the compressor as described above, a new stall control line $SCL_2$ is drawn a distance from the stall line SL in the stable operating region. The distance between the stall line SL and the new stall control line $SCL_2$ is defined as the new stall margin $SM_2$. As shown, the compressor may be operated more closely to stall line SL, allowing for less stall margin and operation at more aerodynamic and thermodynamic efficient points. In some embodiments, the compressor may be operated directly on the stall line SL or even to the left of the stall line SL with shaft damping provided by adjustment of control parameters of the electric generator.

Additionally, damping compressor instability with an electric generator operatively coupled thereto may allow greater transient or overall mechanical power extraction from the turbine engine. For example, the need to bleed air from the compressor or actuate variable geometry components would be reduced or eliminated, and thus, a greater volume of the mass flow flowing through the compressor can be used for useful work. Furthermore, damping compressor instability with an electric generator operatively coupled thereto may allow for lower idle power flow conditions which could result in reduced fuel flow. Also, depending on the transient, damping compressor instability with an electric generator operatively coupled thereto may allow for removal of a transient bleed valve if operation in the region of the transient can be stabilized by the electric generator damping.

Figure 8:
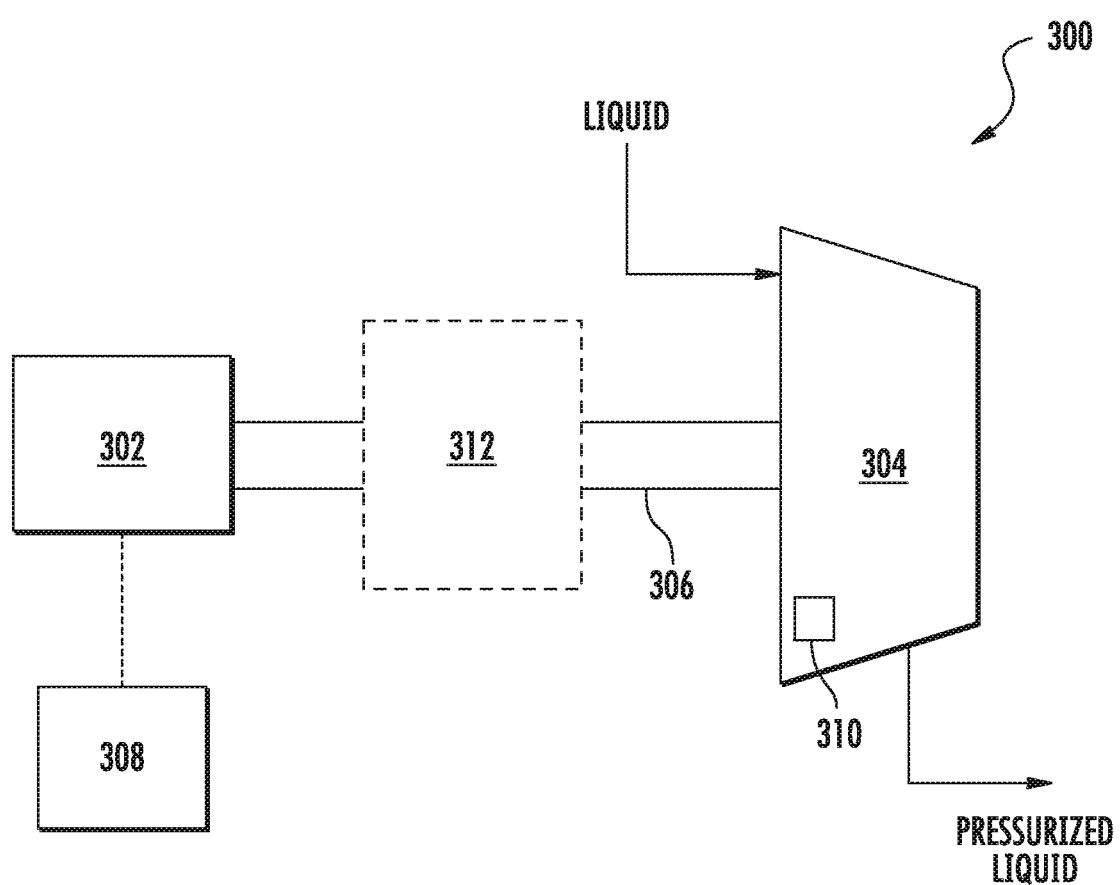
FIG. 8 provides a schematic view of an exemplary compression system in accordance with an exemplary embodiment of the present disclosure.

FIG. 8 provides a compression system 300 in accordance with an exemplary embodiment of the present disclosure. As shown in FIG. 8, the compression system 300 includes a pump 304 configured to pressurize an incoming fluid stream into a pressurized fluid stream. For the depicted embodiment of the FIG. 8, the fluid is liquid, and thus the pump 304 is configured to pressurize an incoming liquid stream into a pressurized liquid stream. In other embodiments, however, the fluid may be a gas. The compression system 300 also includes a shaft system that includes a shaft 306. The shaft 306 is operatively coupled with the pump 304.

Further, the compression system 300 includes an electric machine 302 operatively coupled with the pump 304 via the shaft 306 of the shaft system. In some embodiments, the electric machine 302 is an electric generator configured for generating electrical power. In such embodiments, the compression system 300 includes a torque source 312 configured for operatively driving the pump 304. The torque source 312 may be any suitable device or system capable of providing a torque output to drive the pump 304, such as a turbine engine, a piston-driven engine, etc. The torque source 312 may be operatively coupled with the pump 304 via shaft 306 or via another suitable shaft. In some alternative embodiments, the electric machine 302 is an electric motor or drive configured for operatively driving the pump 304 (i.e., rotating the pump 304 about its axis of rotation). Thus, in such embodiments, the electric motor is the torque source for the pump 304.

Moreover, the compression system 300 includes a controller 308 for controlling the electric machine 302. The controller 308 is communicatively coupled with one or more sensors 310 (only one shown in FIG. 8). The one or more sensors 310 are configured to sense various parameters indicative of the system state of the pump 304 during operation, e.g., mass flow, pressure, and/or the rotational speed of the shaft 306, etc.

In embodiments in which the electric machine 302 is an electric generator, the electric generator may be utilized to provide shaft damping for instability fluctuations of the fluid within pump 304 in the manner described above. That is, the controller 308 is configured to receive control data indicative of a system state of the fluid stream within the pump 304. The control data may be received from one or more of the sensors 310. Upon receiving of the control data, the controller 308 processes the data in a manner described above and ultimately determines a damping control command that is ultimately used to adjust a control parameter of the electric generator. By adjusting the control parameter of the electric generator, the controller 308 controls an output of the electric generator to dampen pressure fluctuations of the pressurized fluid stream based at least in part on the system state of the fluid stream. That is, by adjusting one or more control parameters of the electric generator, the torque load that the electric generator places on the shaft 306 is adjusted or changed, and such changes cause the rotational speed of the shaft 306 to change as well. Such shaft speed changes are used to dampen flow instability within the pump 304.

In embodiments in which the electric machine 302 is an electric motor, the electric motor may be utilized to provide shaft damping for instability fluctuations of the fluid within pump 304. In particular, controller 308 is configured to receive control data indicative of a system state of the fluid stream within the pump 304. The control data may be received from one or more of the sensors 310. Upon receiving the control data, the controller 308 processes the data in a manner as described more fully below and ultimately determines a damping control command that is ultimately used to adjust a control parameter of the electric motor, e.g., motor torque output or motor torque speed. By adjusting the control parameter of the electric motor, the controller 308 controls an output of the electric motor to dampen pressure fluctuations of the pressurized fluid stream based at least in part on the system state of the fluid stream. That is, by adjusting one or more control parameters of the electric motor, the change in torque output of the motor adjusts or changes the shaft speed of the shaft 306. Such shaft speed changes are used to dampen flow instability within the pump 304.

Figure 9:
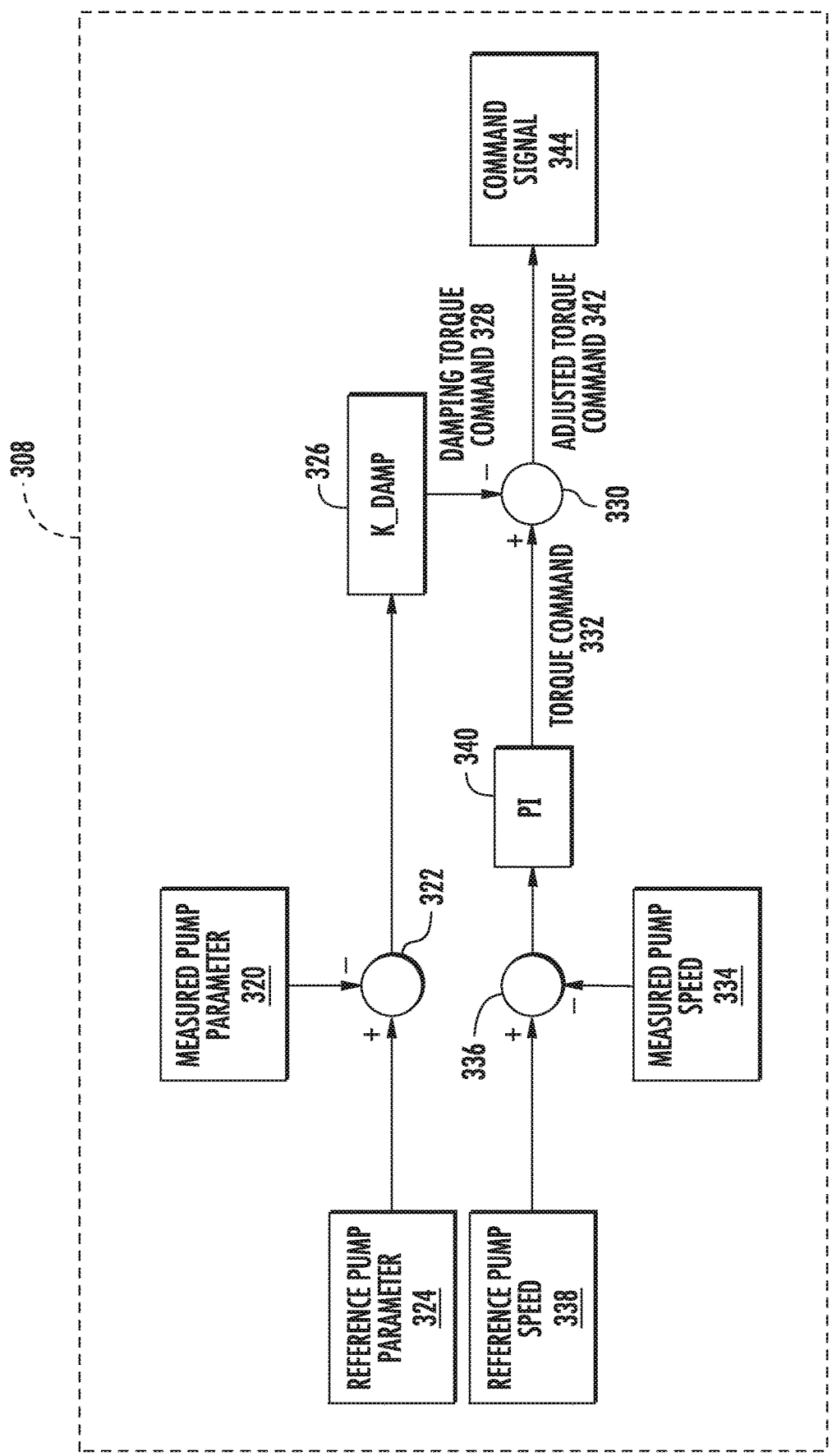
FIG. 9 provides a block diagram of one exemplary manner in which a control parameter of an electric motor may be adjusted in accordance with an exemplary embodiment of the present disclosure.

FIG. 9 provides an exemplary block diagram of one exemplary manner in which a control parameter of the electric motor may be adjusted in accordance with an exemplary embodiment of the present disclosure. As shown in FIG. 9, a measured pump parameter 320, such as the mass flow of the fluid stream flowing through the pump or the pressure of the fluid stream flowing through the pump, is input into a summation block 322. The measured pump parameter 320 may be received as part of the control data. A reference pump parameter 324 is likewise input into the summation block 322. The reference pump parameter 324 may likewise be received as part of the control data. The value of the reference pump parameter 324 is based at least in part on the operating point of the pump. That is, the value of the reference pump parameter 324 is input based on the predicted or modeled value at the particular operating point at which the pump is being operated. The reference pump parameter 324 may be the expected mass flow of the fluid stream flowing through the pump, the expected pressure of the fluid stream flowing through the pump, etc. At the summation block 322, the measured pump parameter 320 is subtracted from the reference pump parameter 324. For example, the measured mass flow may be subtracted from the reference mass flow. As another example, the measured pressure may be subtracted from the reference pressure. The difference of the operation at the summation block 322 is forwarded to a gain block 326 where the gain of the system is determined. The gain of the system is the damping control command, which for this embodiment is a damping torque command 328. The damping torque command 328 is forwarded to a summation block 330 where the damping torque command 328 is subtracted from a control command, which for this embodiment is a torque command 332. In short, the damping torque command 328 is utilized to adjust the torque command 332 as will be explained further below.

As further shown in FIG. 9, the torque command 332 is generated as follows. A measured pump speed 334 (which may be an actually measured value or an estimated value) is input into a summation block 336. The measured pump speed 334 may be received as part of the control data. A reference pump speed 338 is likewise input into the summation block 336. The reference pump speed 338 may be received as part of the control data. The value of the reference pump speed 338 is based at least in part on the operating point of the pump. At the summation block 336, the measured pump speed 334 is subtracted from the reference pump speed 338. The difference of this operation is forwarded to a proportional integral block 340. The proportional integral block 340 outputs the torque command 332. The torque command 332 is then forwarded to the summation block 330. The damping torque command 328 is subtracted from the torque command 332. The difference of this operation is the adjusted torque command 342. A command signal 344 is generated based on the adjusted torque command 158. The command signal 344 is used to adjust the control parameter of the electric motor so that the torque output of the electric motor adjusts the output of the shaft system, e.g., shaft 306 of FIG. 8. The adjustment of the shaft system, e.g., shaft speed, is used for damping flow instability of the pump. It will be appreciated that FIG. 9 provides one exemplary manner in which a control parameter of the electric motor may be adjusted and that other control methods are possible.

Figure 10:
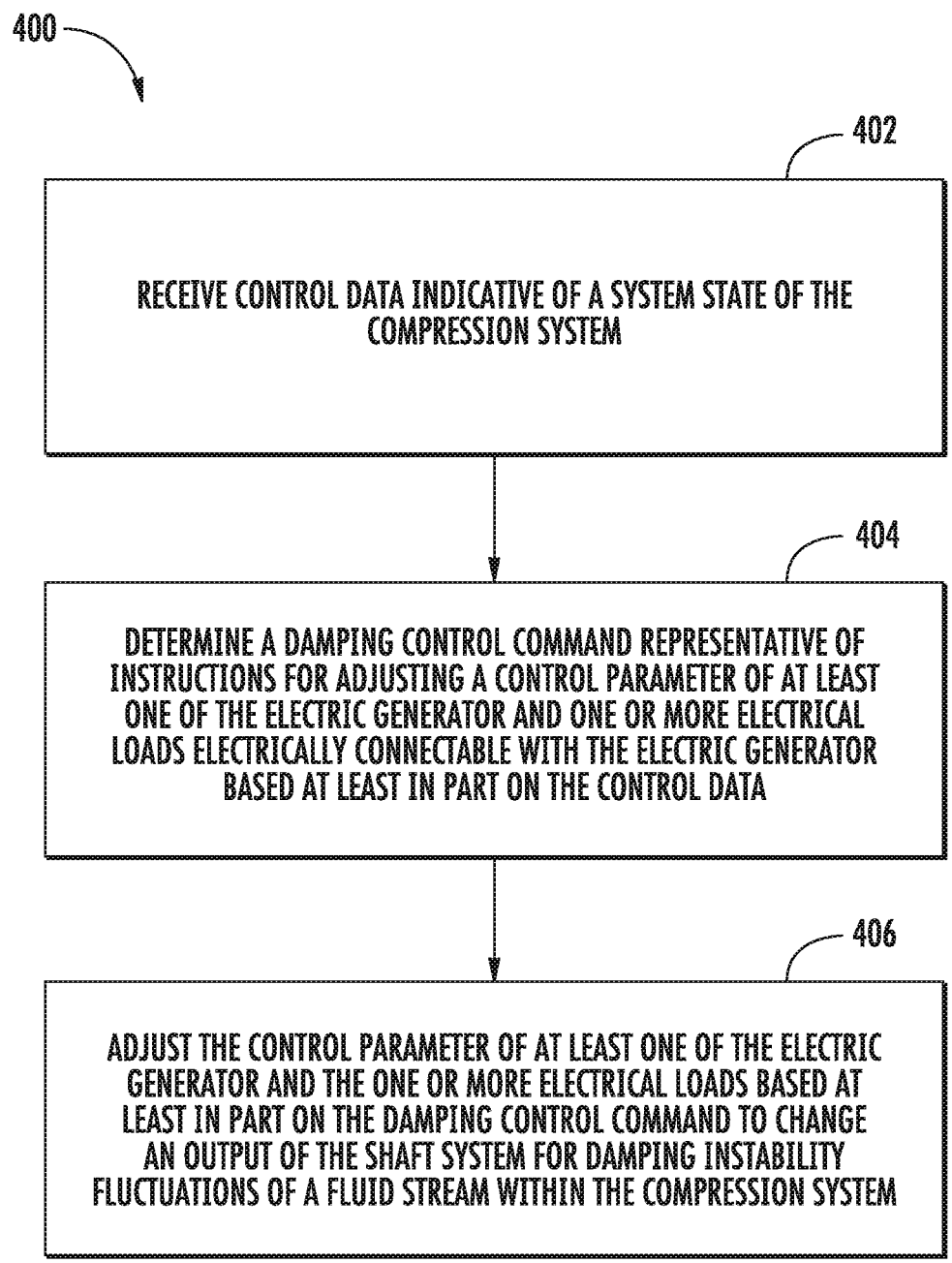
FIG. 10 provides a flow diagram of an exemplary method in accordance with an exemplary embodiment of the present disclosure.

FIG. 10 provides a flow diagram of an exemplary method (400) for active stability control of a compression system operatively coupled with an electric generator via a shaft system in accordance with exemplary embodiments of the present disclosure. For instance, the exemplary method (400) may be utilized for stability control of a compressor or pump, e.g., such as those described herein. It should be appreciated that the exemplary method (400) is discussed herein only to describe exemplary aspects of the present subject matter, and is not intended to be limiting.

At (402), the method (400) includes receiving control data indicative of a system state of the compression system. For instance, the control data may include various measured or estimated compression system parameters. Example compression system parameters include the pressure and/or mass flow through the compression system. Such compression system parameters are indicative of the system state of the compression system. In some instances, the compression system parameters may reveal the onset of a flow instability, e.g., stall. The compression system may a compressor or pump, for example. A controller may receive the control data.

At (404), the method (400) includes determining a damping control command representative of instructions for adjusting a control parameter of at least one of the electric generator and one or more electrical loads electrically connectable with the electric generator based at least in part on the control data. For instance, the damping control command may be determined based at least in part on the control data. In particular, the control data may include a measured compression system parameter, e.g., a mass flow or pressure of the fluid stream within the compression system, and the measured compression system parameter may be subtracted from a reference compression system parameter. The difference is forwarded to a gain block that multiplies the difference by a gain. The output of the gain block is the damping control command. The damping control command is representative of instructions for adjusting a control parameter of the electric generator. More particularly, in some implementations, the method (400) further includes generating a control command based at least in part on a rotational speed (i.e., a measured rotational speed) of one or more rotational components of the compression system (e.g., compressor blades, the rotor, etc.). In such implementations, the measured rotational speed of the one or more rotational components of the compression system is subtracted from a reference rotational speed of the one or more rotational components of the compression system. The value of the reference rotational speed is based at least in part on the operating point of the compression system. That is, the value of the reference rotational speed is an expected value at the particular operating point of the compression system. The difference of the measured rotational speed subtracted from the reference rotational speed is the control command, which may be for example, a torque command.

In such implementations, the method (400) also includes determining an adjusted control command based at least in part on the control command and the damping control command. That is, once the damping control command and the control command are generated or computed by the controller, the difference of the damping control command subtracted from the control command is the adjusted control command, which may be an adjusted torque command, for example. Further, the method (400) includes generating a command signal representative of instructions for adjusting the control parameter of the electric generator. For instance, the adjusted control command may be forwarded to a control loop that may generate a command signal based at least in part on the adjusted torque command. The command signal is representative of instructions for adjusting a control parameter of the electric machine and/or one or more electrical loads electrically connected to the electric generator, e.g., via a power bus system. For instance, the instructions may include commands for changing or adjusting a speed output of the rotor of the electric generator, a torque output of the electric generator, a power output of the electric generator, or a voltage output of the electric generator. As other examples, the instructions may include commands for modulating an electrical load off and on, e.g., directly or indirectly via a controllable source or element.

At (406), the method (400) includes adjusting the control parameter of at least one of the electric generator and the one or more electrical loads based at least in part on the damping control command to change an output of the shaft system for damping instability fluctuations of the pressurized air stream within the compression system. For instance, once the control signal is generated and routed to the appropriate components of the electric generator or electrical loads on the power bus system, the control parameter of the electric generator and/or the one or more electrical loads is/are adjusted. When the control parameter is adjusted, the torque load that the electric generator places or puts on the shaft system changes. The adjustment of the torque load on the shaft system causes the rotational speed of one or more of the shafts operatively coupling the electric generator with the compression system to change. The change or adjustment in shaft speed is used for damping instability fluctuations of the pressurized fluid stream within the compression system. Notably, the torque load that the electric generator places on the shaft system may be adjusted slightly and rapidly so that the shaft speed oscillates in a manner suitable for damping instability fluctuations.

In some implementations, the method (400) additionally includes accessing a database that correlates the damping control command with an amount of damping remaining that is required for stabilizing the compression system at a current operating characteristic of the compression system. The method (400) also includes ascertaining the amount of damping remaining by correlating the damping control command at the current operating characteristic of the compression system.

Figure 11:
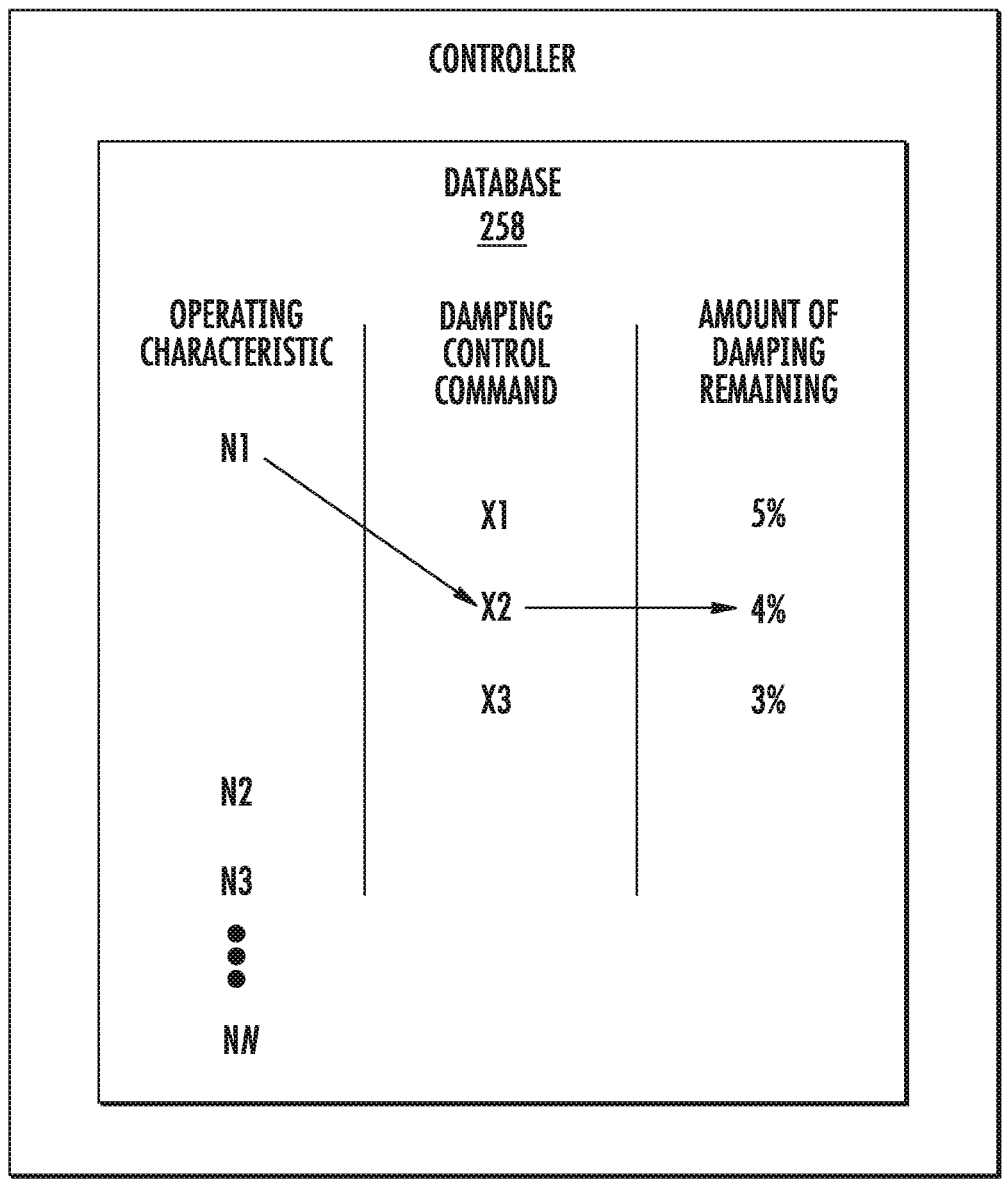
FIG. 11 provides an exemplary view of a database in accordance with an exemplary embodiment of the present disclosure.

FIG. 11 provides an exemplary view of a database 350 in accordance with an exemplary embodiment of the present disclosure. As shown, the database 350 correlates various damping control commands with an amount of damping remaining that is required for stabilizing the compression system at a current operating characteristic of the compression system. That is, for a particular operating characteristic of the compression system (i.e., N1, N2, N3, and so on to $N_N$), the database 350 correlates a damping control command with an amount of damping remaining that is required for stabilizing the compression system. Once the database 350 is accessed, the amount of damping remaining may be ascertained by correlating the damping control command with the amount of damping remaining at the current operating characteristic of the compression system. The amount of damping remaining may be useful for a number of purposes. For instance, one purpose could be to allow normal operation of the compression system closer to the stall line for improved efficiency or improved engine transient response. The operating points may be selected based on compression system characterization, and if a given compression system requires damping at such operating points, an adjustment to operating point may be made from the onset of stall conditions to move the operating point to a more stable region. The amount of damping remaining may facilitate movement of the operating point to a stable region whilst not moving the operating point to a point that is unnecessarily far from the stall line. Stable operation with active damping has be demonstrated beyond the stall line, and thus, the operating points may be chosen left of the stall line. Of course, operating points may be chosen on the stall line and adjacent the stall line along the right side (i.e., in the stable region of the compression system map).

Further, in some implementations, the gain of the gain block (e.g., 146 of FIG. 5) is varied or adjusted based at least in part on the amount of damping remaining to achieve the ideal amplitude decay of the instability fluctuations of the compression system. Thus, over time, the gain block multiplies the input (i.e., the difference of the measured compressor parameter 136 subtracted from the reference compressor parameter 138) by a varied gain to achieve a more ideal or satisfactory amplitude decay (i.e., damping ratio).

In some implementations, the compression system is a system of a turbine engine, such as e.g. a gas turbine engine. The turbine engine is configured in a similar manner as the turbine engine of FIG. 2. Particularly, the turbine engine includes a high pressure compressor, a high pressure turbine, and a high pressure shaft operatively coupling the high pressure compressor with the high pressure turbine. The turbine engine also includes a low pressure compressor positioned upstream of the high pressure compressor, a low pressure turbine positioned downstream of the high pressure turbine, and a low pressure shaft operatively coupling the low pressure compressor and the low pressure turbine. In such implementations, the electric generator is operatively coupled with the low pressure shaft, e.g., as shown in FIG. 2. Further, in such implementations, the control data received by the controller is indicative of the system state of the high pressure compressor. Notably, the controller can control at least one of the electric generator and the one or more electrical loads to adjust the control parameter based at least in part on the damping control command to change an output of the low pressure shaft for damping instability fluctuations of the pressurized air stream within the high pressure compressor. Thus, instability fluctuations occurring within the high pressure compressor may be dampened by changing the electrical load on the electrical generator coupled with the low pressure shaft. That is, shaft damping may be provided by a shaft not directly coupled with the target compression system. The aero coupling of the LP and HP compressors allows for damping instability fluctuations of the pressurized air stream within the high pressure compressor utilizing the low pressure shaft.

Figure 12:
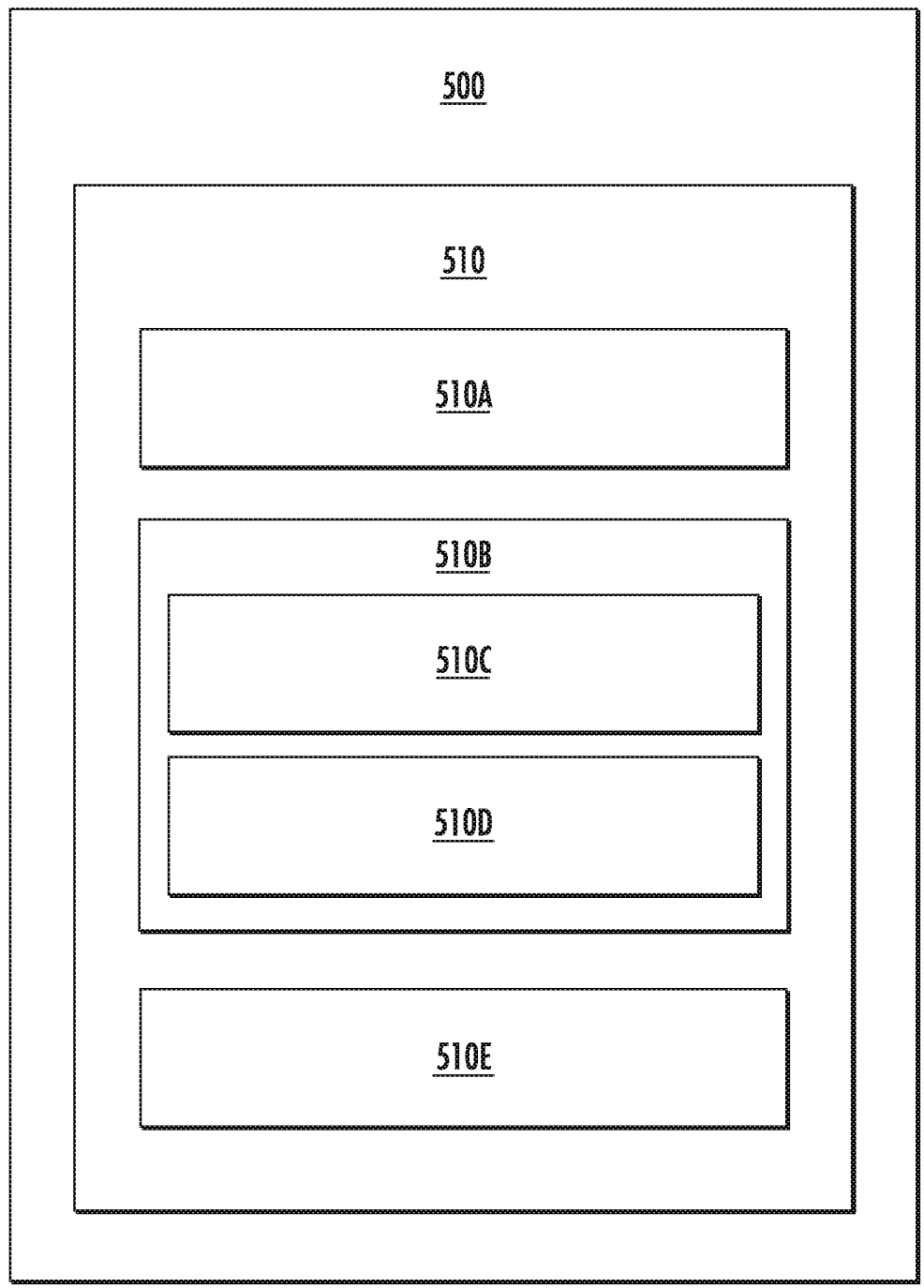
FIG. 12 provides an example computing system according to example embodiments of the present disclosure.

FIG. 12 provides an example computing system 500 according to example embodiments of the present disclosure. The controller 120 and/or 308 may include various components and perform various functions of the computing system 500 described below, for example.

As shown in FIG. 12, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, operations for active stability control of a compression system (e.g., method (400)), and/or any other operations or functions of the one or more computing device(s) 510. Accordingly, the method (400) may be a computer-implemented method, such that each of the steps of the exemplary method (400) are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as an external remote control, can be configured to receive one or more commands from the computing device(s) 510 or provide one or more commands to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbine engine, comprising: a compressor configured to pressurize an incoming air stream into a pressurized air stream; a combustion chamber fluidly connected with the compressor and configured to receive the pressurized air stream from the compressor, wherein fuel is injected into the pressurized air stream and ignited in the combustion chamber so as to raise a temperature and energy level of the pressurized air stream; a turbine fluidly connected with the combustion chamber and configured to receive combustion products that flow from the combustion chamber; a shaft system; an electric generator operatively coupled with the compressor via the shaft system; one or more electrical loads electrically connectable with the electric generator via a power bus system; a controller configured to: receive control data indicative of a system state of the compressor; determine a damping control command representative of instructions for adjusting a control parameter of at least one of the electric generator and the one or more electrical loads based at least in part on the control data; and control at least one of the electric generator and the one or more electrical loads to adjust the control parameter based at least in part on the damping control command to change an output of the shaft system for damping instability fluctuations of the pressurized air stream within the compressor.

2. The turbine engine of clause 1, wherein the control data indicative of the system state of the compressor comprises at least one of a mass flow of the pressurized air stream through the compressor, a pressure of the pressurized air stream flowing through the compressor, and a rotational speed of the compressor.

3. The turbine engine of any preceding clause, wherein the damping control command is determined based at least in part on a measured compressor parameter and a reference compressor parameter, wherein the reference compressor parameter is based at least in part on an operating point of the compressor.

4. The turbine engine of any preceding clause, wherein in determining the damping control command, the controller is configured to: generate a control command based at least in part on a rotational speed of the compressor; determine an adjusted control command based at least in part on the control command and the damping control command; and generate a command signal representative of instructions for adjusting the control parameter of at least one of the electric generator and the one or more electrical loads.

5. The turbine engine of any preceding clause, further comprising: one or more sensors communicatively coupled with the controller and configured for sensing one or more compressor parameters indicative of the system state of the compressor, wherein the control data is received at least in part from the one or more sensors.

6. The turbine engine of any preceding clause, wherein the control data received by the controller further comprises an electrical power demand placed on the electric generator by the one or more electrical loads electrically connected with the electric generator, and wherein at least one of the electric generator and the one or more electrical loads are controlled to adjust the control parameter based at least in part on the electrical power demand.

7. The turbine engine of any preceding clause, wherein the control parameter is one of a speed output, a torque output, and a power output of the electric generator.

8. The turbine engine of any preceding clause, wherein the output of the shaft system is a shaft speed of one or more shafts of the shaft system, and wherein when the shaft speed of the shaft system is changed, a rotational speed of the compressor is changed for damping instability fluctuations of the pressurized air stream within the compressor.

9. The turbine engine of any preceding clause, wherein the damping control command is representative of instructions for adjusting a control parameter of the one or more electrical loads electrically connected to the electric generator based at least in part on the control data, and wherein the one or more electrical loads are controlled, directly or indirectly by one or more controllable sources on the power bus system, by the controller to adjust the control parameter based at least in part on the damping control command to change an output of the shaft system for damping instability fluctuations of the pressurized air stream within the compressor.

10. The turbine engine of any preceding clause, wherein the compressor is a high pressure compressor, the turbine is a high pressure turbine, and the shaft system comprises a high pressure shaft operatively coupling the high pressure compressor with the high pressure turbine, and wherein the turbine engine further comprises: a low pressure compressor positioned upstream of the high pressure compressor; a low pressure turbine positioned downstream of the high pressure turbine, wherein the shaft system comprises a low pressure shaft operatively coupling the low pressure compressor and the low pressure turbine, and wherein the electric generator is operatively coupled with the low pressure shaft and the control data is indicative of the system state of the high pressure compressor, and wherein the controller is configured to control at least one of the electric generator and the one or more electrical loads to adjust the control parameter based at least in part on the damping control command to change an output of the low pressure shaft for damping instability fluctuations of the pressurized air stream within the high pressure compressor.

11. The turbine engine of any preceding clause, wherein the turbine engine is an aeroderivative gas turbine engine.

12. The turbine engine of any preceding clause, wherein the turbine engine is an auxiliary power unit.

13. The turbine engine of any preceding clause, wherein the compressor is a centrifugal compressor.

14. A method for active stability control of a compression system operatively coupled with an electric generator via a shaft system, the method comprising: receiving control data indicative of a system state of the compression system; determining a damping control command representative of instructions for adjusting a control parameter of at least one of the electric generator and one or more electrical loads electrically connectable with the electric generator based at least in part on the control data; and adjusting the control parameter of at least one of the electric generator and the one or more electrical loads based at least in part on the damping control command to change an output of the shaft system for damping instability fluctuations of a fluid stream within the compression system.

15. The method of clause 14, further comprising: generating a control command based at least in part on a rotational speed of one or more rotational components of the compression system; determining an adjusted control command based at least in part on the control command and the damping control command; and generating a command signal representative of instructions for adjusting the control parameter of at least one of the electric generator and the one or more electrical loads.

16. The method of any preceding clause, further comprising: accessing a database that correlates the damping control command with an amount of damping remaining that is required for stabilizing the compression system at a current operating characteristic of the compression system; and ascertaining the amount of damping remaining by correlating the damping control command at the current operating characteristic of the compression system.

17. A compression system, comprising: a pump configured to pressurize a fluid stream; a shaft system; an electric machine operatively coupled with the pump via the shaft system; a controller configured for controlling the electric machine and configured to: receive one or more compression system parameters indicative of a system state of the pump; and control a torque output of the electric machine to dampen pressure fluctuations of the fluid stream based at least in part on the system state of the pump.

18. The compression system of clause 17, wherein the electric machine is an electric generator.

19. The compression system of any preceding clause, wherein the electric machine is an electric motor.

20. The compression system of any preceding clause, wherein the fluid stream is a liquid stream.

What is claimed is:

1. A turbine engine, comprising:
  a compressor configured to pressurize an incoming air stream into a pressurized air stream;
  a combustion chamber fluidly connected with the compressor and configured to receive the pressurized air stream from the compressor, wherein fuel is injected into the pressurized air stream and ignited in the combustion chamber so as to raise a temperature and energy level of the pressurized air stream;
  a turbine fluidly connected with the combustion chamber and configured to receive combustion products that flow from the combustion chamber;
  a shaft system;
  an electric generator operatively coupled with the compressor via the shaft system;
  one or more electrical loads electrically connectable with the electric generator via a power bus system;
  a controller configured to:
    receive control data indicative of a system state of the compressor, wherein the control data indicative of the system state of the compressor comprises at least one of a mass flow of the pressurized air stream through the compressor, a pressure of the pressurized air stream flowing through the compressor, and a rotational speed of the compressor;
    determine a damping control command representative of instructions for adjusting a control parameter of the electric generator based at least in part on the control data, the control parameter being a voltage output of the electric generator; and control the electric generator to adjust the control parameter based at least in part on the damping control command to change an output of the shaft system for damping instability fluctuations of the pressurized air stream within the compressor, and wherein in controlling the electric generator to adjust the control parameter based at least in part on the damping control command to change the output of the shaft system for damping instability fluctuations of the pressurized air stream within the compressor, the controller is configured to cause a torque load placed on the shaft system by the electric generator i) that is in phase with mass flow fluctuations of the pressurized air stream within the compressor; or ii) that is out of phase with the mass flow fluctuations of the pressurized air stream within the compressor according to a phase lag offset.

2. The turbine engine of claim 1, wherein the damping control command is determined based at least in part on a measured compressor parameter and a reference compressor parameter, wherein the reference compressor parameter is based at least in part on an operating point of the compressor.

3. The turbine engine of claim 1, wherein in determining the damping control command, the controller is configured to:
generate a control command based at least in part on a rotational speed of the compressor;
determine an adjusted control command based at least in part on the control command and the damping control command; and
generate a command signal representative of instructions for adjusting the control parameter of the electric generator.

4. The turbine engine of claim 1, further comprising:
one or more sensors communicatively coupled with the controller and configured for sensing one or more compressor parameters indicative of the system state of the compressor, wherein the control data is received at least in part from the one or more sensors.

5. The turbine engine of claim 1, wherein the control data received by the controller further comprises an electrical power demand placed on the electric generator by the one or more electrical loads electrically connected with the electric generator, and wherein the electric generator is controlled to adjust the control parameter based at least in part on the electrical power demand.

6. The turbine engine of claim 1, wherein the output of the shaft system is a shaft speed of one or more shafts of the shaft system, and wherein when the shaft speed of the shaft system is changed, a rotational speed of the compressor is changed for damping instability fluctuations of the pressurized air stream within the compressor.

7. The turbine engine of claim 1, wherein the damping control command is representative of instructions for adjusting a control parameter of the one or more electrical loads electrically connected to the electric generator based at least in part on the control data, and
wherein the one or more electrical loads are controlled, directly or indirectly by one or more controllable sources on the power bus system, by the controller to adjust the control parameter based at least in part on the damping control command to change an output of the shaft system for damping instability fluctuations of the pressurized air stream within the compressor.

8. The turbine engine of claim 1, wherein the compressor is a high pressure compressor, the turbine is a high pressure turbine, and the shaft system comprises a high pressure shaft operatively coupling the high pressure compressor with the high pressure turbine, and wherein the turbine engine further comprises:
a low pressure compressor positioned upstream of the high pressure compressor;
a low pressure turbine positioned downstream of the high pressure turbine, wherein the shaft system comprises a low pressure shaft operatively coupling the low pressure compressor and the low pressure turbine, and
wherein the electric generator is operatively coupled with the low pressure shaft and the control data is indicative of the system state of the high pressure compressor, and wherein the controller is configured to control the electric generator to adjust the control parameter based at least in part on the damping control command to change an output of the low pressure shaft for damping instability fluctuations of the pressurized air stream within the high pressure compressor.

9. The turbine engine of claim 1, wherein the turbine engine is an aeroderivative gas turbine engine.

10. The turbine engine of claim 1, wherein the turbine engine is an auxiliary power unit.

11. The turbine engine of claim 1, wherein the compressor is a centrifugal compressor.

12. The turbine engine of claim 1, wherein the turbine engine is a turbofan.

13. The turbine engine of claim 1, the torque load placed on the shaft system by the electric generator is in phase with mass flow fluctuations of the pressurized air stream within the compressor.

14. The turbine engine of claim 1, wherein the torque load placed on the shaft system by the electric generator is out of phase with mass flow fluctuations of the pressurized air stream within the compressor according to the phase lag offset.

15. A method for active stability control of a compression system operatively coupled with an electric generator via a shaft system, the method comprising:
receiving control data indicative of a system state of the compression system, wherein the control data indicative of the system state of the compressor comprises at least one of a mass flow of the pressurized air stream through the compressor, a pressure of the pressurized air stream flowing through the compressor, and a rotational speed of the compressor;
determining a damping control command representative of instructions for adjusting a control parameter of the electric generator based at least in part on the control data, the control parameter being a voltage output of the electric generator; and
adjusting the control parameter of the electric generator based at least in part on the damping control command to change an output of the shaft system for damping instability fluctuations of a fluid stream within the compression system, and wherein the electric generator is controlled to adjust the control parameter based at least in part on an electrical power demand placed on the electric generator by one or more electrical loads electrically connected with the electric generator.

16. The method of claim 15, further comprising:
generating a control command based at least in part on a rotational speed of one or more rotational components of the compression system;
determining an adjusted control command based at least in part on the control command and the damping control command; and generating a command signal representative of instructions for adjusting the control parameter of the electric generator.

17. The method of claim 15, further comprising:
accessing a database that correlates the damping control command with an amount of damping remaining that is required for stabilizing the compression system at a current operating characteristic of the compression system; and
ascertaining the amount of damping remaining by correlating the damping control command at the current operating characteristic of the compression system.

18. A turbine engine, comprising:
a compressor configured to pressurize an incoming air stream into a pressurized air stream;
a combustion chamber fluidly connected with the compressor and configured to receive the pressurized air stream from the compressor, wherein fuel is injected into the pressurized air stream and ignited in the combustion chamber so as to raise a temperature and energy level of the pressurized air stream;
a turbine fluidly connected with the combustion chamber and configured to receive combustion products that flow from the combustion chamber;
a shaft system;
an electric generator operatively coupled with the compressor via the shaft system;
one or more electrical loads electrically connectable with the electric generator via a power bus system;
a controller configured to:
receive control data indicative of a system state of the compressor, wherein the control data includes an electrical power demand placed on the electric generator by the one or more electrical loads electrically connected with the electric generator, and wherein the control data indicative of the system state of the compressor comprises at least one of a mass flow of the pressurized air stream through the compressor, a pressure of the pressurized air stream flowing through the compressor, and a rotational speed of the compressor;
determine a damping control command representative of instructions for adjusting a control parameter of at least one of the electric generator and the one or more electrical loads based at least in part on the control data; and
control at least one of the electric generator and the one or more electrical loads to adjust the control parameter based at least in part on the damping control command to change an output of the shaft system for damping instability fluctuations of the pressurized air stream within the compressor, and wherein at least one of the electric generator and the one or more electrical loads are controlled to adjust the control parameter based at least in part on the electrical power demand.

19. The turbine engine of claim 18, wherein the damping control command is representative of instructions for adjusting a control parameter of the one or more electrical loads electrically connected to the electric generator based at least in part on the control data, and
wherein the one or more electrical loads are controlled, directly or indirectly by one or more controllable sources on the power bus system, by the controller to adjust the control parameter based at least in part on the damping control command to change an output of the shaft system for damping instability fluctuations of the pressurized air stream within the compressor.

20. The turbine engine of claim 18, wherein the turbine engine is a turbofan.

* * * * *